(12) United States Patent
Nakagawa

(10) Patent No.: US 11,760,267 B2
(45) Date of Patent: Sep. 19, 2023

(54) IMAGING SYSTEM

(71) Applicant: SONY GROUP CORPORATION, Tokyo (JP)

(72) Inventor: Kei Nakagawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/613,555

(22) PCT Filed: Apr. 30, 2020

(86) PCT No.: PCT/JP2020/018338
§ 371 (c)(1),
(2) Date: Nov. 23, 2021

(87) PCT Pub. No.: WO2020/246186
PCT Pub. Date: Dec. 10, 2020

(65) Prior Publication Data
US 2022/0242317 A1    Aug. 4, 2022

(30) Foreign Application Priority Data
Jun. 4, 2019 (JP) ................................. 2019-104388

(51) Int. Cl.
*B60R 1/24* (2022.01)
*H04N 23/61* (2023.01)

(52) U.S. Cl.
CPC ............... *B60R 1/24* (2022.01); *H04N 23/61* (2023.01); *B60R 2300/30* (2013.01)

(58) Field of Classification Search
CPC ......... B60R 1/24; B60R 2300/30; B60R 1/22; H04N 23/61; H04N 23/12; H04N 25/50; H04N 25/70; H04N 25/77
See application file for complete search history.

(56) References Cited

U.S. PATENT DOCUMENTS

| | | | |
|---|---|---|---|
| 2015/0312493 A1 | 10/2015 | Aldridge et al. | |
| 2017/0033777 A1* | 2/2017 | Kim | ........................ H03K 5/082 |
| 2017/0174261 A1* | 6/2017 | Micks | ................. B62D 15/0255 |
| 2018/0101154 A1 | 4/2018 | Nomoto et al. | |
| 2018/0167575 A1 | 6/2018 | Watanabe et al. | |

(Continued)

FOREIGN PATENT DOCUMENTS

| EP | 3310004 A1 | 4/2018 |
|---|---|---|
| JP | 2013-079937 A | 5/2013 |

(Continued)

OTHER PUBLICATIONS

International Search Report and Written Opinion of PCT Application No. PCT/JP2020/018338, dated Jun. 30, 2020, 09 pages of ISRWO.

*Primary Examiner* — Michael E Teitelbaum
(74) *Attorney, Agent, or Firm* — CHIP LAW GROUP

(57) ABSTRACT

An imaging system of the present disclosure includes an event detection sensor that detects an event, and a controller that controls event detection at the event detection sensor. The event detection sensor is provided with a color filter on a per-pixel basis. In addition, the controller controls the event detection in a specific wavelength band based on the color filter. This makes it possible to detect information in various wavelength bands as events.

17 Claims, 30 Drawing Sheets

(56) References Cited

U.S. PATENT DOCUMENTS

| | | | |
|---|---|---|---|
| 2018/0231660 A1* | 8/2018 | Deane | G01S 17/894 |
| 2019/0225139 A1* | 7/2019 | Kambara | B60Q 1/143 |
| 2020/0036918 A1* | 1/2020 | Ingle | H01L 27/14621 |

FOREIGN PATENT DOCUMENTS

| | | |
|---|---|---|
| JP | 2017-108428 A | 6/2017 |
| JP | 2018-063826 A | 4/2018 |
| JP | 2019-016258 A | 1/2019 |
| WO | 2015/168058 A1 | 11/2015 |
| WO | 2017/013806 A1 | 1/2017 |

* cited by examiner

RCCC

RCCB

RGB

RCGB

RIRGB

GMgCyYe

IMAGING SYSTEM

CROSS REFERENCE TO RELATED APPLICATIONS

This application is a U.S. National Phase of International Patent Application No. PCT/JP2020/018338 filed on Apr. 30, 2020, which claims priority benefit of Japanese Patent Application No. JP 2019-104388 filed in the Japan Patent Office on Jun. 4, 2019. Each of the above-referenced applications is hereby incorporated herein by reference in its entirety.

TECHNICAL FIELD

The present disclosure relates to an imaging system.

BACKGROUND ART

One of imaging devices of an event-driven scheme is an asynchronous imaging device called a DVS (Dynamic Vision Sensor). The asynchronous imaging device is able to detect as an event that a change in luminance of a pixel that photoelectrically converts entering light exceeds a predetermined threshold. Thus, the asynchronous imaging device of this type may also be referred to as an event detection sensor. An existing event detection sensor is installed aboard a vehicle and used as an event-based visual sensor for monitoring a road surface (see, for example, PTL 1).

CITATION LIST

Patent Literature

PTL 1: Japanese Unexamined Patent Application Publication No. 2013-79937

SUMMARY OF THE INVENTION

Problems to be Solved by the Invention

Incidentally, while a vehicle is traveling, pieces of information in various wavelength bands, including lighting (blinking) of a brake light or taillight of a vehicle traveling in front of the own vehicle, blinking of a direction indicator, a change in color of a traffic light, an electronic sign, etc., come within sight of the driver. Regarding the event detection sensor configured for use aboard a mobile body such as a vehicle, it would be very convenient if the event detection sensor is able to detect pieces information in various wavelength bands around the own vehicle as events.

It is an object of the present disclosure to provide an imaging system that is able to detect pieces of information in various wavelength bands as events.

Means for Solving the Problems

An imaging system of the present disclosure for achieving the object described above includes:
an event detection sensor that detects an event; and
a controller that controls event detection at the event detection sensor.
The event detection sensor is provided with a color filter on a per-pixel basis. The controller controls the event detection in a specific wavelength band based on the color filter.

MODES FOR CARRYING OUT THE INVENTION

Figure 1:
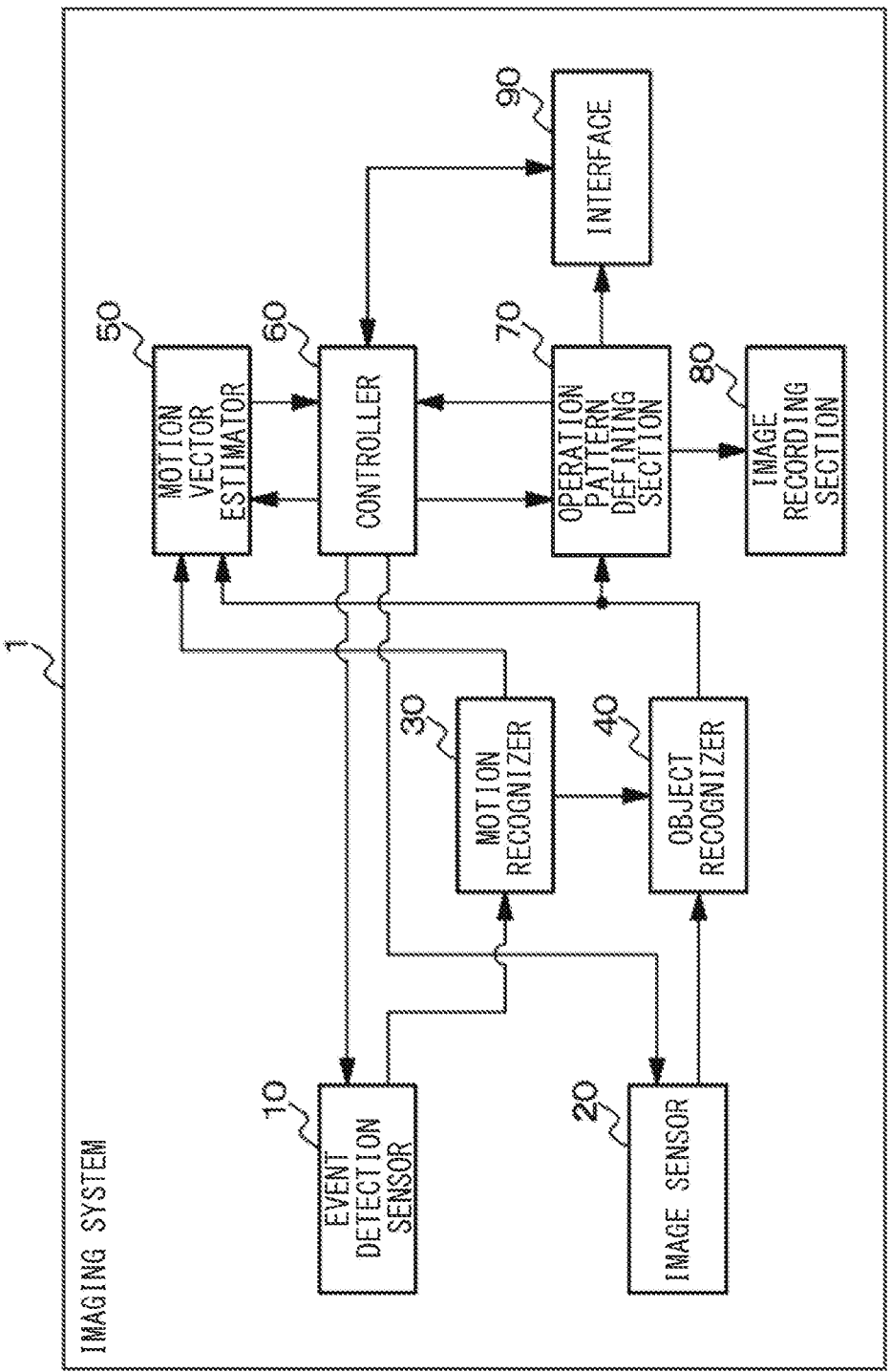
FIG. 1 is a block diagram illustrating an example of a system configuration of an imaging system according to a first embodiment of the present disclosure.

In the following, modes for carrying out the technology according to the present disclosure (hereinafter referred to as "embodiments") will be described in detail with reference to the drawings. The technology according to the present disclosure is not limited to the embodiments. In the following description, the same elements or elements having the same functions are denoted by the same reference signs, and redundant descriptions are omitted. Note that the description will be given in the following order.

1. Overall Description of Imaging System of Present Disclosure
2. First Embodiment of Present Disclosure
   2-1. Configuration Example of Imaging System According to First Embodiment
   2-2. Configuration Example of Event Detection Sensor
      2-2-1. Configuration Example of Pixel Array Section
      2-2-2. Configuration Example of Pixel
      2-2-3. Configuration Example of Event Detector
         2-2-3-1. Configuration Example of Current-to-voltage Conversion Section
         2-2-3-2. Configuration Example of Subtractor and Quantization Section
      2-2-4. Configuration Example of Chip Structure
      2-2-5. Regarding Necessity for Color Filter
      2-2-6. Circuit Configuration Example of Pixels of Four-pixel Sharing
   2-3. Example 1 (Example of Processes of Most Generic Concept of First Embodiment)
   2-4. Example 2 (Example of Sensing Taillight)
   2-5. Example 3 (Example of Sensing Taillight after Recognizing Vehicle)
   2-6. Example 4 (Modification Example of Example 3: Example of Detecting Relative Speed)
   2-7. Example 5 (Example of Sensing Direction Indicator after Recognizing Vehicle)
   2-8. Example 6 (Example of Sensing Red Light after Recognizing Traffic Light)
   2-9. Example 7 (Modification Example of Example 6: Example of Sensing Change from Red Light to Green Light)
3. Second Embodiment of Present Disclosure
   3-1. Configuration Example of Imaging System According to Second Embodiment
   3-2. Configuration Example of Image Sensor
      3-2-1. Configuration Example of CMOS Image Sensor
      3-2-2. Configuration Example of Pixel
      3-2-3. Configuration Example of Chip Structure
         3-2-3-1. Flat-type Chip Structure (So-called Flat Structure)
         3-2-3-2. Stacked-type Chip Structure (So-called Stacked Structure)
   3-3. Example 8 (Example of Processes of Most Generic Concept of Second Embodiment)
   3-4. Example 9 (Example of Sensing Taillight after Recognizing Vehicle)
   3-5. Example 10 (Example of Sensing Direction Indicator after Recognizing Vehicle)
   3-6. Example 11 (Example of Sensing Red Light after Recognizing Traffic Light)
   3-7. Example 12 (Modification Example of Example 11: Example of Sensing Change from Red Light to Green Light)
4. Modification Example
5. Application Example of Technology According to Present Disclosure (Example of Mobile Body)
6. Possible Configurations of Present Disclosure Overall Description of Imaging System of Present Disclosure In an imaging system of the present disclosure, an event detection sensor may have a configuration including an asynchronous imaging device that detects, as an event, that a change in luminance of a pixel that photoelectrically converts entering light exceeds a predetermined threshold. The imaging system of the present disclosure is preferably configured for use aboard a mobile body.

In the imaging system of the present disclosure including the above-described preferred configuration, a controller may be configured to perform signal processing based on an object of attention upon recognizing the object of attention on the basis of event detection by the event detection sensor. Further, the controller may be configured to transmit a predetermined instruction signal to a control system of the mobile body upon recognizing, as the object of attention, a taillight of a vehicle traveling in front of an own vehicle.

Further, in the imaging system of the present disclosure including the above-described preferred configuration, the controller may be configured to recognize, after recognizing a vehicle traveling in front of the own vehicle, a taillight of the vehicle traveling in front of the own vehicle as the object of attention. Further, the controller may be configured to transmit, upon recognizing the taillight as the object of attention, the predetermined instruction signal to the control system of the mobile body in a case where a relative speed of the own vehicle and the vehicle traveling in front of the own vehicle is at or above a predetermined threshold.

Further, in the imaging system of the present disclosure including the above-described preferred configuration, the controller may be configured to transmit, after recognizing a vehicle traveling in front of the own vehicle, a predetermined instruction signal to the control system of the mobile body upon recognizing a direction indicator of the vehicle traveling in front of the own vehicle as the object of attention.

Further, in the imaging system of the present disclosure including the above-described preferred configuration, the controller may be configured to transmit a predetermined instruction signal to the control system of the mobile body upon recognizing a traffic light as the object of attention and sensing a red light, or upon sensing that the traffic light in a state of the red light has changed from the red light to a green light.

Furthermore, the imaging system of the present disclosure including the above-described preferred configuration may have a configuration including an image sensor that performs imaging at a predetermined frame rate. In addition, the controller may be configured to perform, after performing object recognition on the basis of image data of the image sensor, signal processing based on an object of attention upon recognizing the object of attention on the basis of the event detection by the event detection sensor.

Further, in the imaging system of the present disclosure, the controller may be configured to transmit a predetermined instruction signal to the control system of the mobile body upon recognizing, as the object of attention, a taillight of a vehicle traveling in front of the own vehicle after recognizing the vehicle traveling in front of the own vehicle, or upon recognizing, as the object of attention, a directional indicator of a vehicle traveling in front of the own vehicle after recognizing the vehicle traveling in front of the own vehicle.

Further, in the imaging system of the present disclosure including the above-described preferred configuration, the controller may be configured to transmit a predetermined instruction signal to the control system of the mobile body upon recognizing a traffic light as the object of attention and sensing a red light. Alternatively, the controller may be configured to transmit the predetermined instruction signal to the control system of the mobile body upon sensing that the traffic light in a state of the red light has changed from the red light to a green light.

First Embodiment of Present Disclosure

<Configuration Example of Imaging System According to First Embodiment>

FIG. 1 is a block diagram illustrating an example of a system configuration of an imaging system according to a first embodiment of the present disclosure.

As illustrated in FIG. 1, the imaging system 1A according to the first embodiment of the present disclosure has a configuration including an event detection sensor 10, a motion recognizer 30, an object recognizer 40, a controller 50, an operation pattern defining section 60, a recording section 70, and an interface 80. The imaging system 1A according to the first embodiment is usable aboard a mobile body, such as a vehicle.

For example, in a case of use aboard a vehicle, the imaging system 1A is to be disposed at a predetermined position on the vehicle for use, such as at least one of positions on the vehicle including a front nose, a side mirror, a rear bumper, a back door, and an upper part of a windshield within the interior of the vehicle, for example. An application example of the technology according to the present disclosure (i.e., the imaging system 1A according to the first embodiment) will be described in detail later.

As the event detection sensor 10, it is possible to use an asynchronous imaging device called DVS that detects as an event that a change in luminance of a pixel that photoelectrically converts entering light exceeds a predetermined detection threshold. The asynchronous imaging device is an imaging device that detects an event asynchronously with a vertical synchronization signal, in contrast to a synchronous imaging device that performs imaging in synchronization with the vertical synchronization signal. Details of the event detection sensor 10 including the asynchronous imaging device will be described later. It is to be noted that although the DVS is described here as an asynchronous imaging device, the DVS may be adapted to detect an event in synchronization with the vertical synchronization signal.

Figure 2A:
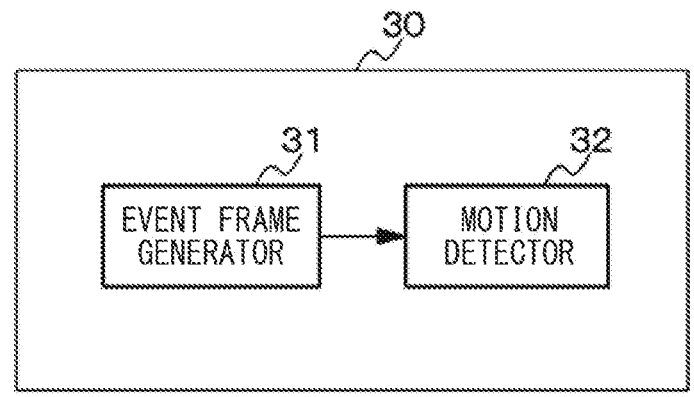
FIG. 2A is a block diagram illustrating an example of a configuration of a motion recognizer in the imaging system according to the first embodiment.

The motion recognizer 30 recognizes (detects) motion of an object on the basis of an event signal (event data) outputted from the event detection sensor 10 and indicating an occurrence of an event. An example of a specific configuration of the motion recognizer 30 is illustrated in FIG. 2A. The motion recognizer 30 includes, for example, an event frame generator 31 and a motion detector 32.

On the basis of the event signal outputted from the event detection sensor 10, the event frame generator 31 generates an event frame by framing how many events have occurred within a certain period of time. The motion detector 32 performs motion detection among event frames resulting from the framing by the event frame generator 31. It is to be noted that the motion detection may be performed by causing the motion recognizer 30 to directly receive the event signal being outputted in an asynchronous manner, without involving the framing by the event frame generator 31.

Figure 2B:
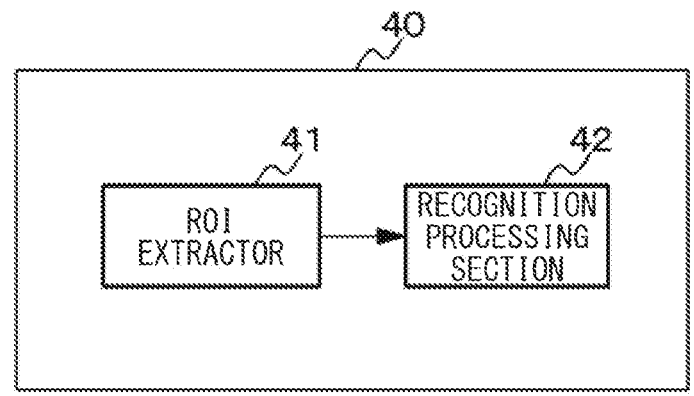
FIG. 2B is a block diagram illustrating an example of a configuration of an object recognizer in the imaging system according to the first embodiment.

On the basis of a result of the motion detection supplied from the motion recognizer 30, the object recognizer 40 performs a recognition process on an object detected as an event. An example of a specific configuration of the object recognizer 40 is illustrated in FIG. 2B. The object recognizer 40 includes, for example, an ROI extractor 41 and a recognition processing section 42.

The ROI extractor 41 performs extraction of a specific region for performing object recognition, that is, extraction of a ROI (Region Of Interest: region of interest). The recognition processing section 42 performs the recognition process on the object on the basis of data of the region extracted by the ROI extractor 41. For recognition of the object at the recognition processing section 42, it is possible to employ a pattern recognition technique by machine learning such as a neural network, that is, for example, a technique to perform image recognition by making a comparison between a feature point of an image supplied as training data and a feature point of a captured subject image.

The controller 50 includes, for example, a processor (CPU) and controls the event detection sensor 10, specifically, controls a resolution of the event detection sensor 10 on the basis of information supplied from the operation pattern defining section 60. Various pieces of information such as vehicle speed are supplied via the interface 80 to the controller 50 from a vehicle control system 12000 (see FIG. 29) to be described later, which is an example of a mobile body control system to which the technology according to the present disclosure is applicable. Details of the control on the resolution of the event detection sensor 10 will be described later.

Under the control by the controller 50, the operation pattern defining section 60 senses a traveling state of a vehicle as an example of the mobile body, such as a traffic congestion state, a traveling state on an expressway, or the like by using the result of motion recognition supplied from the motion recognizer 30 and the result of object recognition supplied from the object recognizer 40.

Information outputted from the operation pattern defining section 60 is supplied to the controller 50 as information for controlling the resolution of the event detection sensor 10, and is stored in the storage section 70 on an as-needed basis. In addition, the information outputted from the operation pattern defining section 60 is supplied to the vehicle control system 12000 (see FIG. 29) via the interface 80.

In the imaging system 1A according to the first embodiment of the present disclosure having the described-above configuration, the imaging device of the present disclosure is configured by including at least the event detection sensor 10 and the controller 50. In the imaging device of the present disclosure, the controller 50 performs control to switch resolutions of the event detection sensor 10 depending on the traveling state of the vehicle as an example of the mobile body. In addition, an imaging system configuration in which the vehicle control system 12000 is provided with the functions of the operation pattern defining section 60 and the recording section 70 is also employable.

<Configuration Example of Event Detection Sensor>

Figure 3:
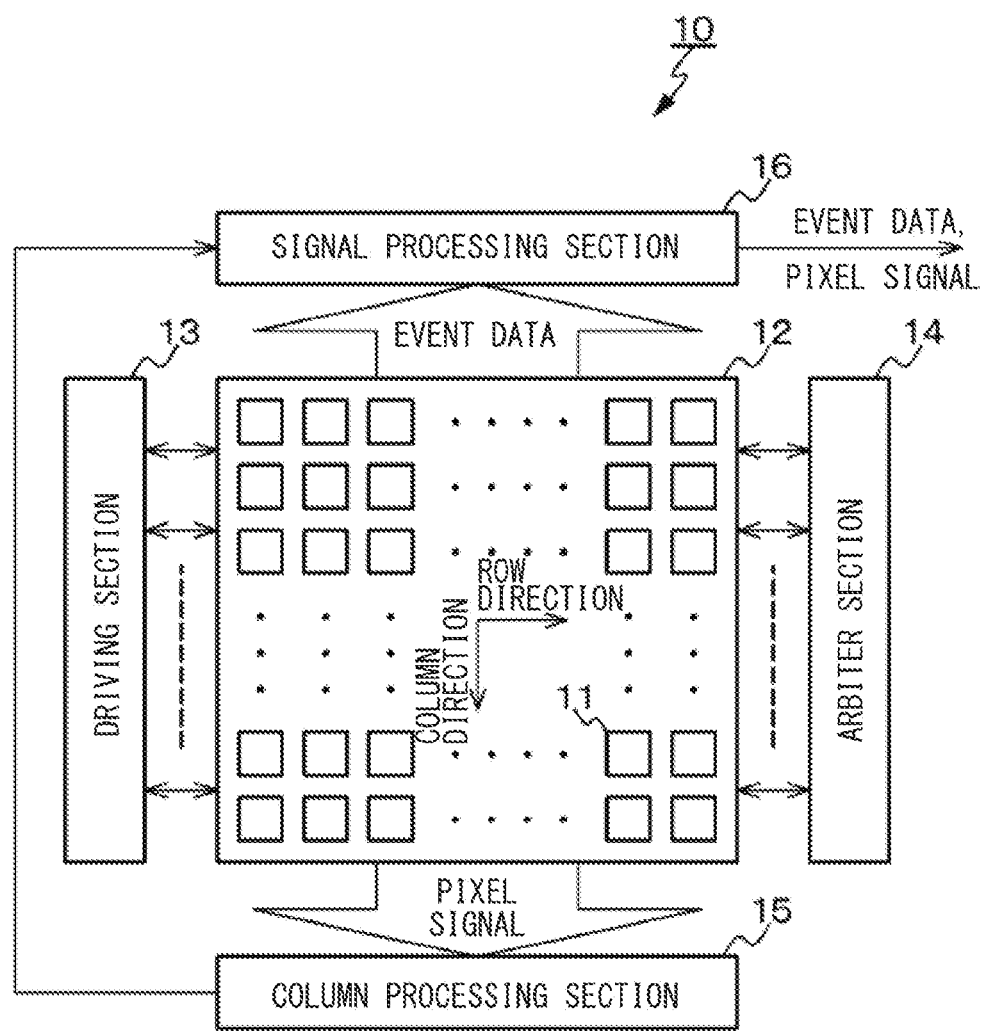
FIG. 3 is a block diagram illustrating an example of a configuration of an event detection sensor in the imaging system according to the first embodiment.

Details of the event detection sensor 10 will be described below. FIG. 3 is a block diagram illustrating an example of a configuration of the event detection sensor 10 in the imaging system 1 of the present disclosure having the above-described configuration.

As illustrated in FIG. 3, the event detection sensor 10 includes a pixel array section 12 including a plurality of pixels 11 arranged two-dimensionally in a matrix form (array form). The plurality of pixels 11 each generates, as a pixel signal, an analog signal of a voltage corresponding to a photocurrent as an electric signal generated by photoelectric conversion. In addition, the plurality of pixels 11 each detects the presence or absence of an event on the basis of whether or not a change exceeding a predetermined threshold has occurred in the photocurrent corresponding to the luminance of entering light. In other words, the plurality of pixels 11 each detects as an event that a change in luminance exceeds the predetermined threshold.

The event detection sensor 10 includes, in addition to the pixel array section 12, a driving section 13, an arbiter section (arbitration section) 14, a column processing section 15, and a signal processing section 16, as peripheral circuit sections for the pixel array section 12.

Upon detection of an event, the plurality of pixels 11 each outputs to the arbiter section 14 a request for output of event data indicating the occurrence of the event. Then, in a case where a response indicating approval for output of the event data is received from the arbiter section 14, the plurality of pixels 11 each outputs the event data to the driving section 13 and the signal processing section 16. In addition, the pixel 11 that has detected the event outputs an analog pixel signal generated by photoelectric conversion to the column processing section 15.

The driving section 13 drives each pixel 11 in the pixel array section 12. For example, the driving section 13 drives the pixel 11 that has detected an event and outputted the event data, and causes the analog pixel signal of that pixel 11 to be outputted to the column processing section 15.

The arbiter section 14 arbitrates requests for output of event data supplied from the respective plurality of pixels 11 and transmits to each of the pixels 11 a response based on the arbitration result (approval/disapproval for output of the event data) and a reset signal for resetting the event detection.

The column processing section 15 includes, for example, an analog-to-digital conversion section including an assembly of analog-to-digital converters provided for each pixel column of the pixel array section 12. Examples of the analog-to-digital converter include a single-slope analog-to-digital converter.

At the column processing section 15, processing is performed for each pixel column of the pixel array section 12 to convert the analog pixel signals outputted from the pixels 11 in the column into digital signals. It is also possible for the column processing section 15 to subject the digitized pixel signals to CDS (Correlated Double Sampling) processing.

The signal processing section 16 executes predetermined signal processing on the digitized pixel signals supplied from the column processing section 15 and the event data outputted from the pixel array section 12, and outputs the event data and the pixel signals having undergone the signal processing.

As described above, a change in the photocurrent generated at the pixel 11 can be regarded as a change in light amount (change in luminance) of light entering the pixel 11. Therefore, an event can also be said to be a change in light amount (change in luminance) at the pixel 11 exceeding a predetermined threshold. The event data indicating the occurrence of the event includes at least position information, such as coordinates, indicating the position of the pixel 11 where the change in light amount, as the event, has occurred. The event data can include a polarity of the change in light amount, in addition to the position information.

Regarding the sequence of event data outputted from the pixels 11 at timings when events occurred, the event data can be said to implicitly include time information indicating a relative time when the event occurred, as long as an interval between pieces of event data remains in the same state as when the events occurred. However, the time information implicitly included in the event data is lost if the interval between the pieces of event data no longer remains in the same state as when the events occurred, due to a reason such as recordation of the event data in memory. To cope with this, the signal processing section 16 adds time information, such as a time stamp, indicating a relative time at which the event occurred, to the event data before the interval between pieces of event data no longer remains in the same state as when the events occurred.

[Configuration Example of Pixel Array Section]

Figure 4:
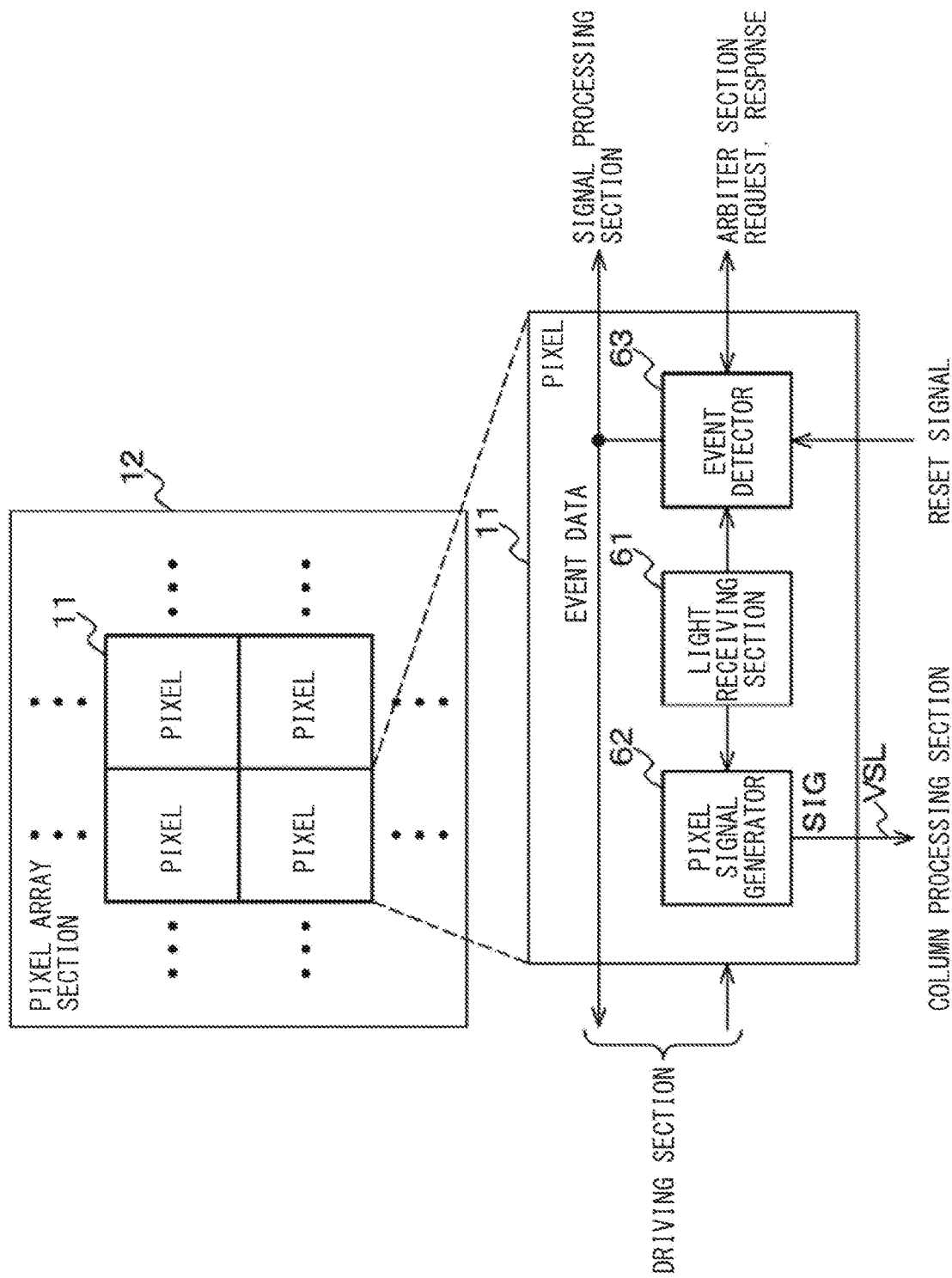
FIG. 4 is a block diagram illustrating an example of a configuration of a pixel array section in the event detection sensor.

FIG. 4 is a block diagram illustrating an example of a configuration of the pixel array section 12 in the event detection sensor 10.

In the pixel array section 12 in which the plurality of pixels 11 is two-dimensionally arranged in a matrix form, the plurality of pixels 11 each includes a light receiving section 61, a pixel signal generator 62, and an event detector 63.

In the pixel 11 having the above-described configuration, the light receiving section 61 photoelectrically converts entering light to generate a photocurrent. Then, the light receiving section 61 supplies a signal of a voltage corresponding to the photocurrent generated by photoelectrically converting the entering light to either the pixel signal generator 62 or the event detector 63 in accordance with control by the driving section 13 (see FIG. 3).

The pixel signal generator 62 generates an analog pixel signal SIG from the signal of the voltage corresponding to the photocurrent supplied from the light receiving section 61. The pixel signal generator 62 then supplies the generated analog pixel signal SIG to the column processing section 15 (see FIG. 3) via a vertical signal line VSL wired for each pixel column of the pixel array section 12.

The event detector 63 detects the presence or absence of the occurrence of an event on the basis of whether or not the amount of change of the photocurrent supplied from each of the light receiving sections 61 exceeds a predetermined threshold. The events include, for example, an on-event indicating that the amount of change of the photocurrent exceeds an upper threshold and an off-event indicating that the amount of change falls below a lower threshold. In addition, the event data indicating the occurrence of the event includes one bit representing a result of detection of the on-event and one bit representing a result of detection of the off-event. It is to be noted that the event detector 63 may also be configured to detect only the on-event.

Upon occurrence of an event, the event detector 63 outputs to the arbiter section 14 (see FIG. 3) a request for output of the event data indicating the occurrence of the event. Then, in the case where a response from the request is received from the arbiter section 14, the event detector 63 outputs the event data to the driving section 13 and the signal processing section 16.

[Circuit Configuration Example of Pixel]

Figure 5:
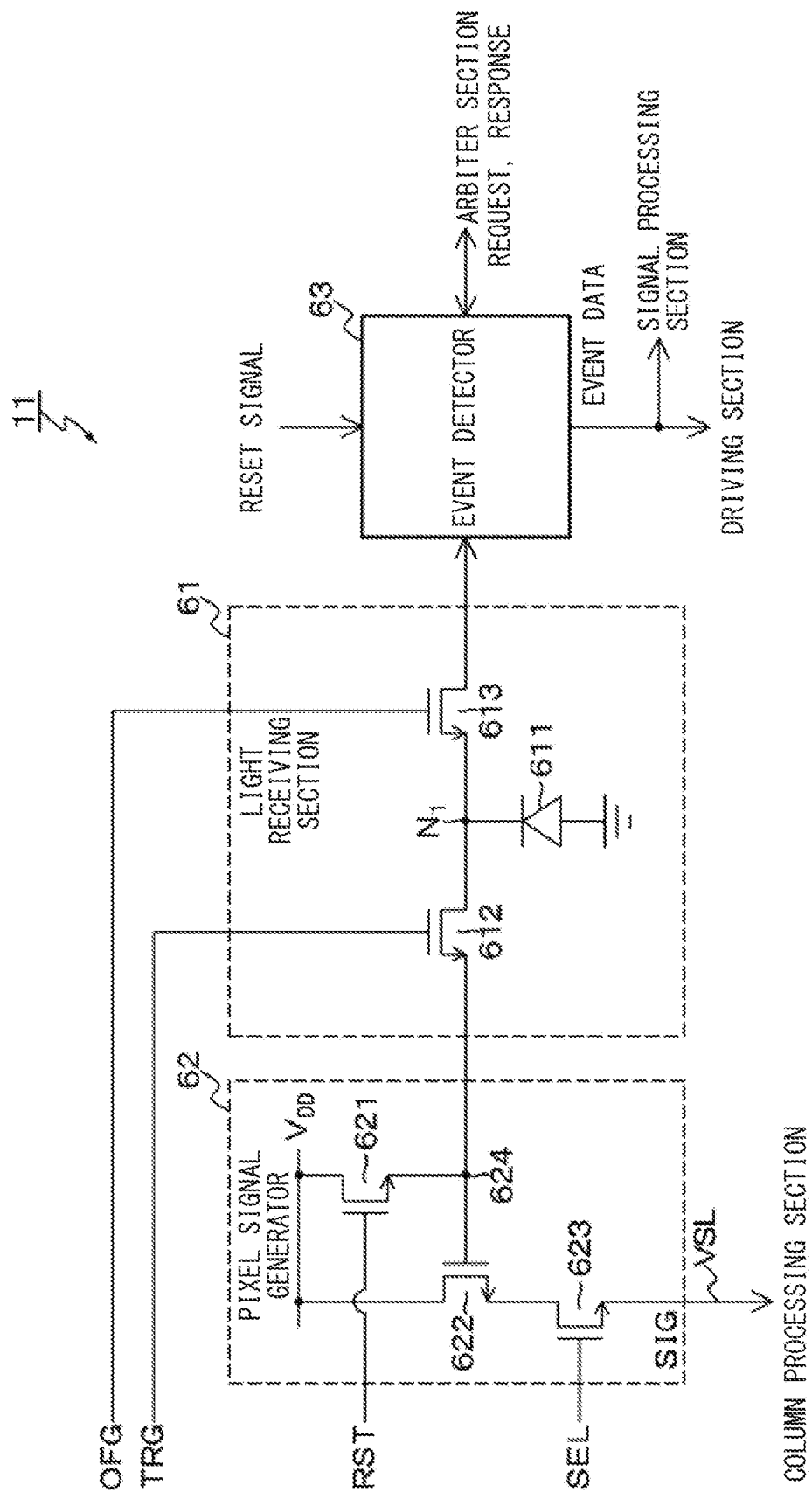
FIG. 5 is a circuit diagram illustrating an example of a circuit configuration of a pixel in the event detection sensor.

FIG. 5 is a circuit diagram illustrating an example of a circuit configuration of the pixel 11 of the pixel array section 12 in the event detection sensor 10.

As described above, the plurality of pixels 11 each has a configuration including the light receiving section 61, the pixel signal generator 62, and the event detector 63.

In the pixel 11 having the above-described configuration, the light receiving section 61 has a configuration including a light receiving element (photoelectric conversion element) 611, a transfer transistor 612, and a transfer transistor 613. As the transfer transistor 612 and the transfer transistor 613, for example, N-type MOS (Metal Oxide Semiconductor) transistors are usable. The transfer transistor 612 and the transfer transistor 613 are coupled in series to each other.

The light receiving element 611 is coupled between a common connection node $N_1$ between the transfer transistor 612 and the transfer transistor 613 and a ground, and photoelectrically converts entering light to generate electric charge having an electric charge amount corresponding to the light amount of the entering light.

A transfer signal TRG is supplied from the driving section 13 illustrated in FIG. 3 to a gate electrode of the transfer transistor 612. The transfer transistor 612 turns on in response to the transfer signal TRG and thereby supplies the pixel signal generator 62 with an electric signal generated by the photoelectric conversion performed at the light receiving element 611.

A control signal OFG is supplied from the driving section 13 to a gate electrode of the transfer transistor 613. The transfer transistor 613 turns on in response to the control signal OFG and thereby supplies the event detector 63 with an electric signal generated by the photoelectric conversion performed at the light receiving element 611. The electric signal to be supplied to the event detector 63 is a photocurrent including electric charge.

The pixel signal generator 62 has a configuration including a reset transistor 621, an amplification transistor 622, a selection transistor 623, and a floating diffusion layer 624. As the reset transistor 621, the amplification transistor 622, and the selection transistor 623, for example, N-type MOS transistors are usable.

The electric charge resulting from the photoelectric conversion at the light receiving element 611 of the light receiving section 61 is supplied to the pixel signal generator 62 by the transfer transistor 612. The electric charge to be supplied from the light receiving section 61 is accumulated in the floating diffusion layer 624. The floating diffusion layer 624 converts the accumulated electric charge to generate a voltage signal having a voltage value corresponding to the electric charge amount. That is, the floating diffusion layer 624 serves as an electric charge-to-voltage conversion section that converts electric charge into a voltage.

The reset transistor 621 is coupled between a power supply line of a power supply voltage $V_{DD}$ and the floating diffusion layer 624. A rest signal RST is supplied from the driving section 13 to a gate electrode of the reset transistor 621. The reset transistor 621 turns on in response to the reset signal RST and thereby initializes (resets) the floating diffusion layer 624.

The amplification transistor 622 is couped in series to the selection transistor 623 between the power supply line of the power supply voltage $V_{DD}$ and the vertical signal line VSL. The amplification transistor 622 amplifies the voltage signal resulting from the electric charge-to-voltage conversion at the floating diffusion layer 624.

A selection signal SEL is supplied from the driving section 13 to a gate electrode of the selection transistor 623. The selection transistor 623 turns on in response to the selection signal SEL and thereby outputs the voltage signal amplified by the amplification transistor 622 as the analog pixel signal SIG to the column processing section 15 (see FIG. 3) via the vertical signal line VSL.

In the event detection sensor 10 including the pixel array section 12 in which the pixels 11 having the above-described configuration are two-dimensionally arranged, the driving section 13 is instructed by the controller 50 illustrated in FIG. 1 to start event detection. Upon being instructed to start event detection, the driving section 13 supplies the control signal OFG to the transfer transistor 613 of the light receiving section 61 and thereby drives the transfer transistor 613 to cause a photocurrent corresponding to the electric charge generated at the light receiving element 611 to be supplied to the event detector 63.

Then, once an event is detected at a certain pixel 11, the driving section 13 turns off the transfer transistor 613 of that pixel 11 to cause the supply of the photocurrent to the event detector 63 to be stopped. Next, the driving section 13 supplies the transfer signal TRG to the transfer transistor 612 and thereby drives that transfer transistor 612 to cause the electric charge resulting from the photoelectric conversion at the light receiving element 611 to be transferred to the floating diffusion layer 624.

In this way, the event detection sensor 10 including the pixel array section 12 in which the pixels 11 having the above-described configuration are two-dimensionally arranged outputs to the column processing section 15 the pixel signal of only the pixel 11 where an event is detected. This makes it possible to reduce power consumption of the event detection sensor 10 and a processing amount in image processing as compared with a case of outputting pixel signals of all the pixels regardless of the presence or absence of an event.

It is to be noted that the configuration of the pixel 11 exemplified here is one example, and such a configuration example is thus non-limiting. For example, in a case where it is not necessary to output a pixel signal, a pixel configuration without the pixel signal generator 62 is employable. In a case of employing such a pixel configuration, it is sufficient that the transfer transistor 612 is omitted from the light receiving section 61. In addition, the column processing section 15 of FIG. 3 can also be configured not to have an analog-to-digital conversion function. By employing a pixel configuration that is to output no pixel signal, it is possible to suppress an increase in scale of the event detection sensor 10.

[Configuration Example of Event Detector]

Figure 6:
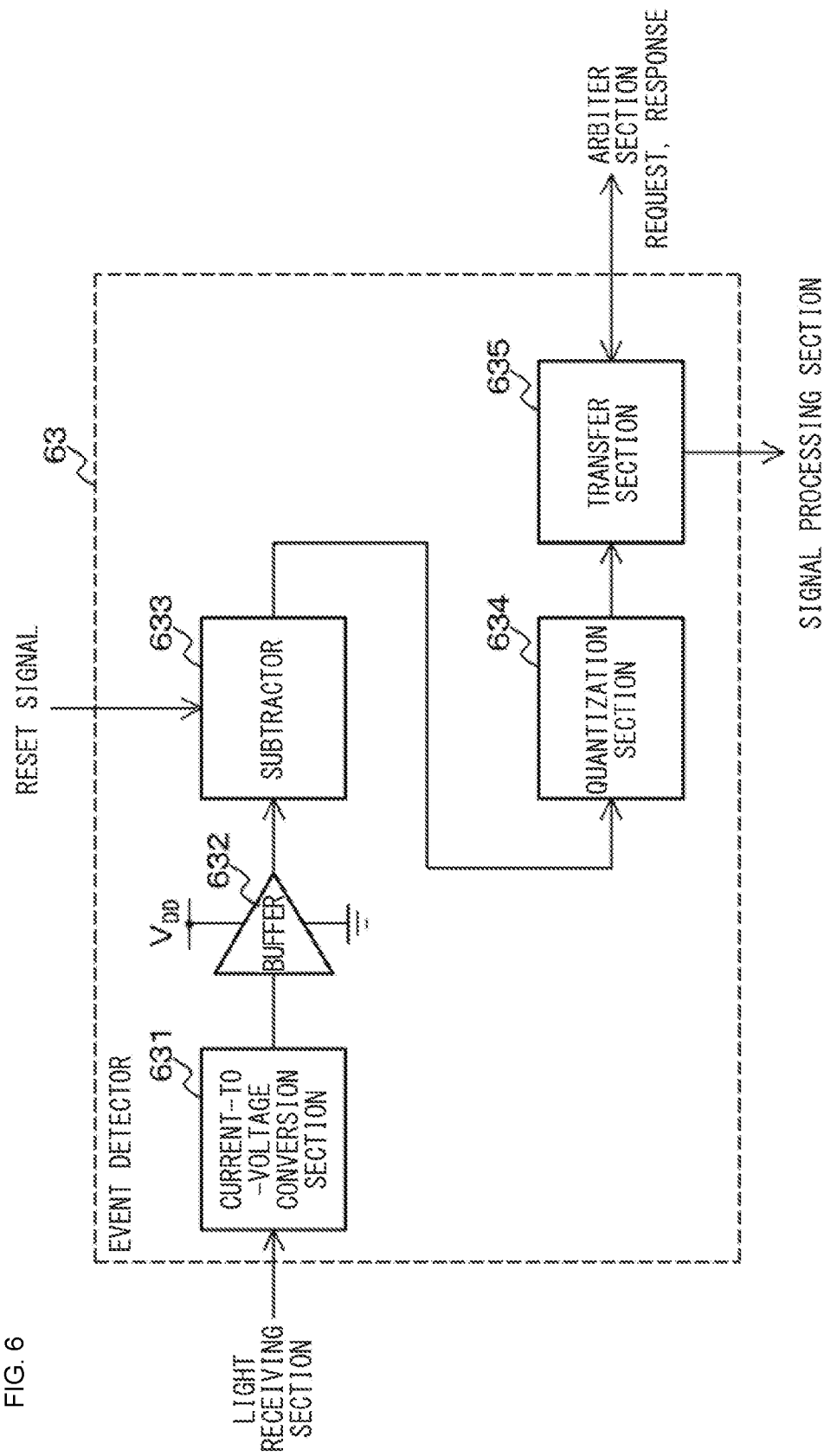
FIG. 6 is a block diagram illustrating an example of a circuit configuration of an event detector in the pixel of the event detection sensor.

FIG. 6 is a block diagram illustrating an example of a configuration of the event detector 63 in the pixel 11 of the event detection sensor 10.

As illustrated in FIG. 6, the event detector 63 according to the present example has a configuration including a current-to-voltage conversion section 631, a buffer 632, a subtractor 633, a quantization section 634, and a transfer section 635.

The current-to-voltage conversion section 631 converts a photocurrent supplied from the light receiving section 63 of the pixel 11 to a voltage signal (which may hereinafter be referred to as a "photovoltage" in some cases) of a logarithm of the photocurrent, and supplies the photovoltage to the buffer 632. The buffer 632 performs buffering of the photovoltage supplied from the current-to-voltage conversion section 631 and supplies the buffered photovoltage to the subtractor 633.

The subtractor 633 calculates a difference between the photovoltage at the present time and a photovoltage at a time that differs from the present time by a very small time period, and supplies a difference signal corresponding to the difference to the quantization section 634. The quantization section 634 quantizes the difference signal supplied from the subtractor 633 into a digital signal, and supplies a digital value of the difference signal to the transfer section 635.

Upon supply of the digital value of the difference signal from the quantization section 634, the transfer section 635 supplies the arbiter section 14 with a request for transmission of event data. Then, upon receiving a response to the request from the arbiter section 14, that is, a response approving output of the event data, the transfer section 635 supplies the event data to the driving section 13 and the signal processing section 16 in accordance with the digital value of the difference signal supplied from the quantization section 634.

Next, a description will be given of configuration examples of the current-to-voltage conversion section 631, the subtractor 633, and the quantization section 634 in the event detector 63.

(Configuration Example of Current-to-Voltage Conversion Section)

Figure 7:
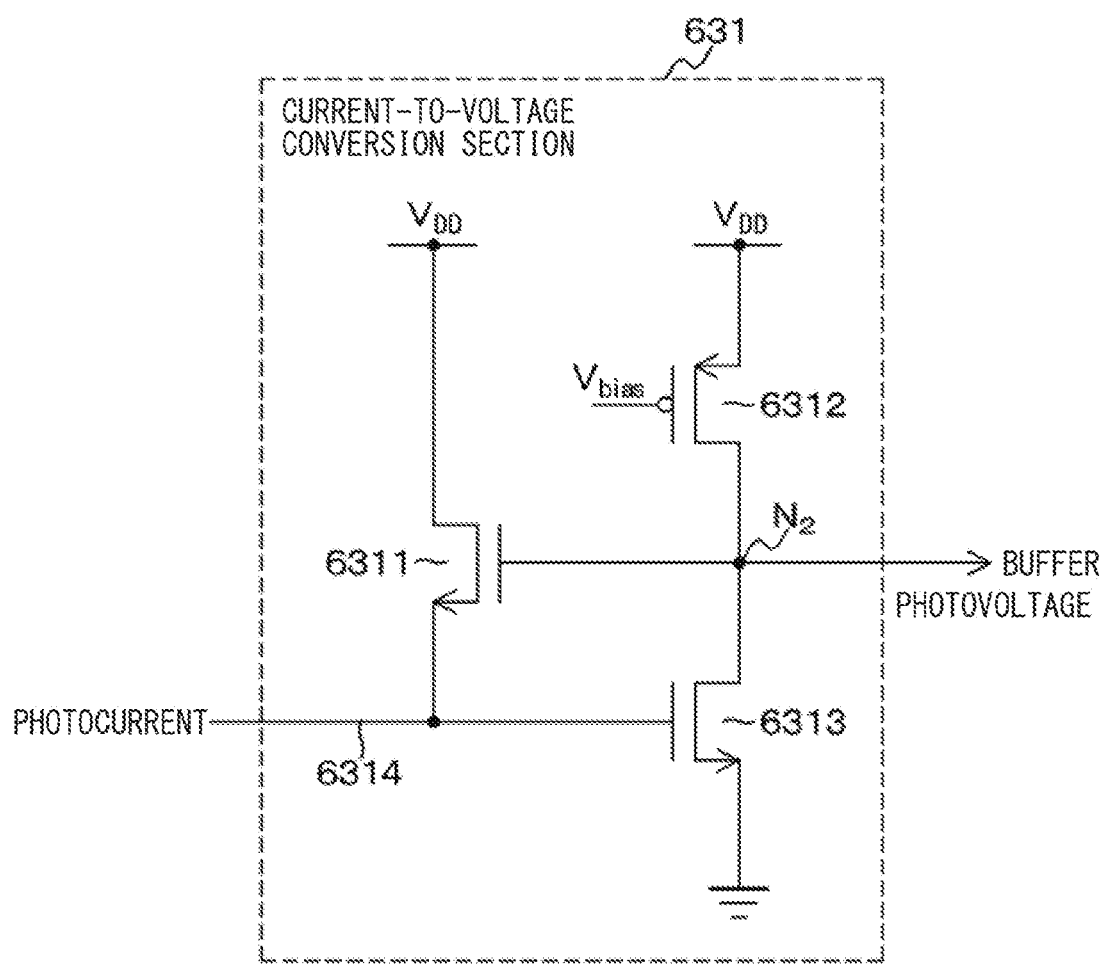
FIG. 7 is a circuit diagram illustrating an example of a configuration of a current-to-voltage conversion section in the event detector.

FIG. 7 is a circuit diagram illustrating an example of a configuration of the current-to-voltage conversion section 631 in the event detector 63.

As illustrated in FIG. 7, the current-to-voltage conversion section 631 according to the present example has a circuit configuration including a transistor 6311, a transistor 6312, and a transistor 6313. As the transistor 6311 and the transistor 6313, N-type MOS transistors are usable. As the transistor 6312, a P-type MOS transistor is usable.

The transistor 6311 is coupled between the power supply line of the power supply voltage $V_{DD}$ and a signal input line 6314. The transistor 6312 and the transistor 6313 are coupled in series between the power supply line of the power supply voltage $V_{DD}$ and the ground. A gate electrode of the transistor 6311 and an input terminal of the buffer 632 illustrated in FIG. 6 are coupled to a common connection node $N_2$ between the transistor 6312 and the transistor 6313.

A predetermined bias voltage $V_{bias}$ is applied to a gate electrode of the transistor 6312. The transistor 6312 thereby supplies a constant current to the transistor 6313. A photocurrent is inputted from the light receiving section 61 to a gate electrode of the transistor 6313 via the signal input line 6314.

A drain electrode of the transistor 6311 is coupled to the power supply line of the power supply voltage $V_{DD}$ and has a source follower configuration. The gate electrode of the transistor 6313 is coupled to a source electrode of the transistor 6311. The photocurrent from the light receiving section 61 is then converted into a photovoltage corresponding to the logarithm of the photocurrent by the transistor 6311 having the source follower configuration and the transistor 6313.

(Configuration Examples of Subtractor and Quantization Section)

Figure 8:
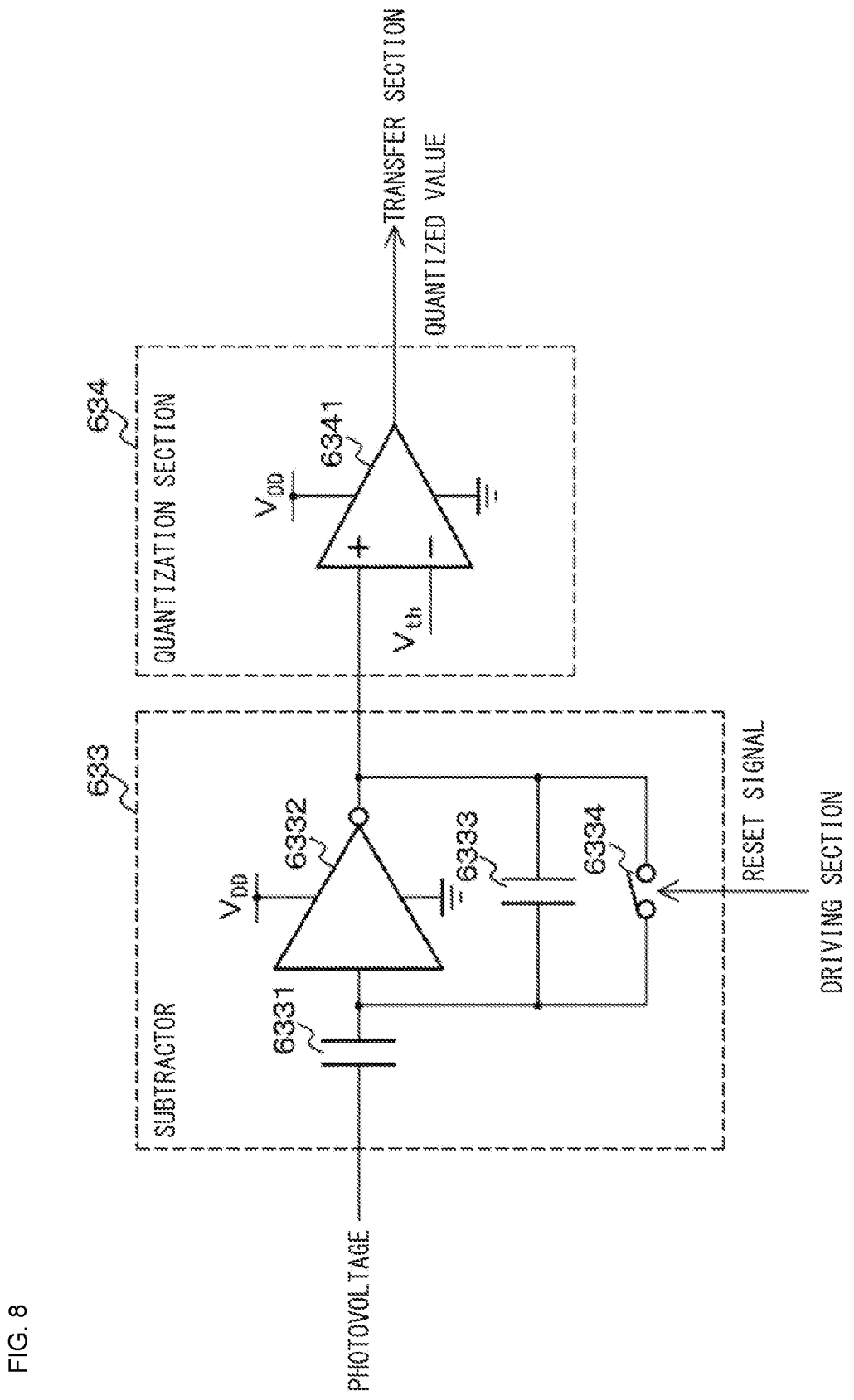
FIG. 8 is a circuit diagram illustrating an example of a configuration of a subtractor and a quantization section in the event detector.

FIG. 8 is a circuit diagram illustrating an example of configurations of the subtractor 633 and the quantization section 634 in the event detector 63.

The subtractor 633 according to the present example has a configuration including a capacitive element 6331, an operational amplifier 6332, a capacitive element 6333, and a switch element 6334.

One end of the capacitive element 6331 is coupled to an output terminal of the buffer 632 illustrated in FIG. 6, and another end of the capacitive element 6331 is coupled to an input terminal of the operational amplifier 6332. The photovoltage supplied from the buffer 632 is thereby supplied to the input terminal of the operational amplifier 6332 via the capacitive element 6331.

The capacitive element 6333 is coupled in parallel to the operational amplifier 6332. The switch element 6334 is coupled between both ends of the capacitive element 6333. As a control signal for opening and closing the switch element 6334, a reset signal is supplied from the arbiter section 14 illustrated in FIG. 3 to the switch element 6334. In response to the reset signal, the switch element 6334 opens or closes a path coupling both ends of the capacitive element 6333.

In the subtractor 633 of the above-described configuration, a photovoltage to be inputted to a buffer-632-side terminal of the capacitive element 6331 when the switch element 6334 is brought into an on (closed) state will be denoted as $V_{init}$. When the photovoltage $V_{init}$ is inputted to the buffer-632-side terminal of the capacitive element 6331, a terminal on the opposite side becomes a virtual ground terminal. For convenience, a potential of this virtual ground terminal is assumed as zero. At this time, if a capacitance value of the capacitive element 6331 is denoted as $C_1$, electric charge $Q_{init}$ accumulated in the capacitive element 6331 is represented by Equation (1) below.

$$Q_{init} = C_1 \times V_{init} \quad (1)$$

Further, in a case where the switch element 6334 is in the on state, both ends of the capacitive element 6333 are short-circuited, and therefore the electric charge accumulated in the capacitive element 6333 is zero. Thereafter, the switch element 6334 comes into an off (open) state. A photovoltage at the buffer-632-side terminal of the capacitive element 6331 in a case where the switch element 6334 is in the off state will be denoted as $V_{after}$. Electric charge $Q_{after}$ to be accumulated in the capacitive element 6331 in the case where the switch element 6334 comes into the off state is represented by Equation (2) below.

$$Q_{after} = C_1 \times V_{after} \quad (2)$$

If a capacitance value of the capacitive element 6333 is denoted as $C_2$ and an output voltage of the operational amplifier 6332 is denoted as $V_{out}$, electric charge $Q_2$ to be accumulated in the capacitive element 6333 is represented by Equation (3) below.

$$Q_2 = -C_2 \times V_{out} \quad (3)$$

Because a total electric charge amount of an electric charge amount of the capacitive element 6331 and an electric charge amount of the capacitive element 6333 does not vary between before and after the switch element 6334 turns off, Equation (4) below holds.

$$Q_{init} = Q_{after} + Q_2 \quad (4)$$

Substituting Equations (1) to (3) into Equation (4) yields Equation (5) below.

$$V_{out} = -(C_1/C_2) \times (V_{after} - V_{init}) \quad (5)$$

According to Equation (5), a subtraction between the photovoltage $V_{init}$ and the photovoltage $V_{after}$, that is, calculation of a difference signal $V_{out}$ corresponding to the difference ($V_{init} - V_{after}$) between the photovoltage $V_{init}$ and the photovoltage $V_{after}$ is performed at the subtractor 633. In addition, according to Equation (5), a gain of the subtraction at the subtractor 633 is $C_1/C_2$. It is generally desired that the gain of the subtraction at the subtractor 633 be maximized. Therefore, it is preferable to design the capacitance value $C_1$ of the capacitive element 6331 to be large and the capacitance value $C_2$ of the capacitive element 6333 to be small.

Meanwhile, if the capacitance value $C_2$ of the capacitive element 6333 is excessively small, kTC noise can increase to degrade a noise characteristic. Therefore, the capacitance reduction in the capacitance value $C_2$ of the capacitive element 6333 is limited to a range within which noise can be tolerated. In addition, because the event detector 63 including the subtractor 633 is to be installed for each pixel 11, the capacitive element 6331 and the capacitive element 6333 are subject to area constrains. The capacitance value $C_1$ of the capacitive element 6331 and the capacitance value $C_2$ of the capacitive element 6333 are determined in consideration of these.

In FIG. 8, the quantization section 634 has a configuration including a comparator 6341. The comparator 6341 receives the difference signal from the subtractor 633 (that is, the output signal of the operational amplifier 6332) as a non-inverted (+) input, and a predetermined threshold voltage $V_{th}$ as an inverted (−) input. The comparator 6341 then compares the difference signal $V_{out}$ from the subtractor 633 and the predetermined threshold voltage $V_{th}$, and outputs a high level or a low level representing a comparison result as a quantized value of the difference signal $V_{out}$ to the transfer section 635 illustrated in FIG. 6.

In a case where it is recognizable from the quantized value of the difference signal $V_{out}$ from the quantization section 634 that a change in light amount (change in luminance) as an event has occurred, that is, in a case where the difference signal $V_{out}$ is larger (or smaller) than the predetermined threshold voltage $V_{th}$, the transfer section 635 outputs, for example, high-level event data indicating the occurrence of the event to the signal processing section 16 of FIG. 3. That is, the threshold voltage $V_{th}$ is a threshold for detecting an event on the basis of a change in light amount (change in luminance) of the pixel 11.

The signal processing section 16 outputs the event data supplied from the transfer section 635, incorporating, into the event data, position information of the pixel 11 that has detected the event indicated by the event data, time information indicating a time at which the event occurred, and, on an as-needed basis, polarity information of the change in light amount as the event.

For example, a data format called AER (Address Event Representation) is employable as a data format of the event data including the position information of the pixel 11 that has detected the event, the time information indicating the time at which the event occurred, and the polarity information of the change in light amount as the event.

It is to be noted that providing the pixel 11 with an optical filter that transmits predetermined light, such as a color filter, makes it possible for the pixel 11 to receive desired light as entering light. For example, in a case where the pixel 11 receives visible light as entering light, the event data indicates, for example, the occurrence of a change in pixel value in an image on which a visually recognizable subject appears. Further, for example, in a case where the pixel 11 receives infrared rays, a millimeter wave, or the like for distance measurement as entering light, the event data indicates the occurrence of a change in distance to the subject. Furthermore, for example, in a case where the pixel 11 receives infrared rays for measurement of temperatures as entering light, the event data indicates the occurrence of a change in temperature of the subject. In the present embodiment, the pixel 11 receives visible light as entering light.

[Configuration Example of Chip Structure]

Figure 9:
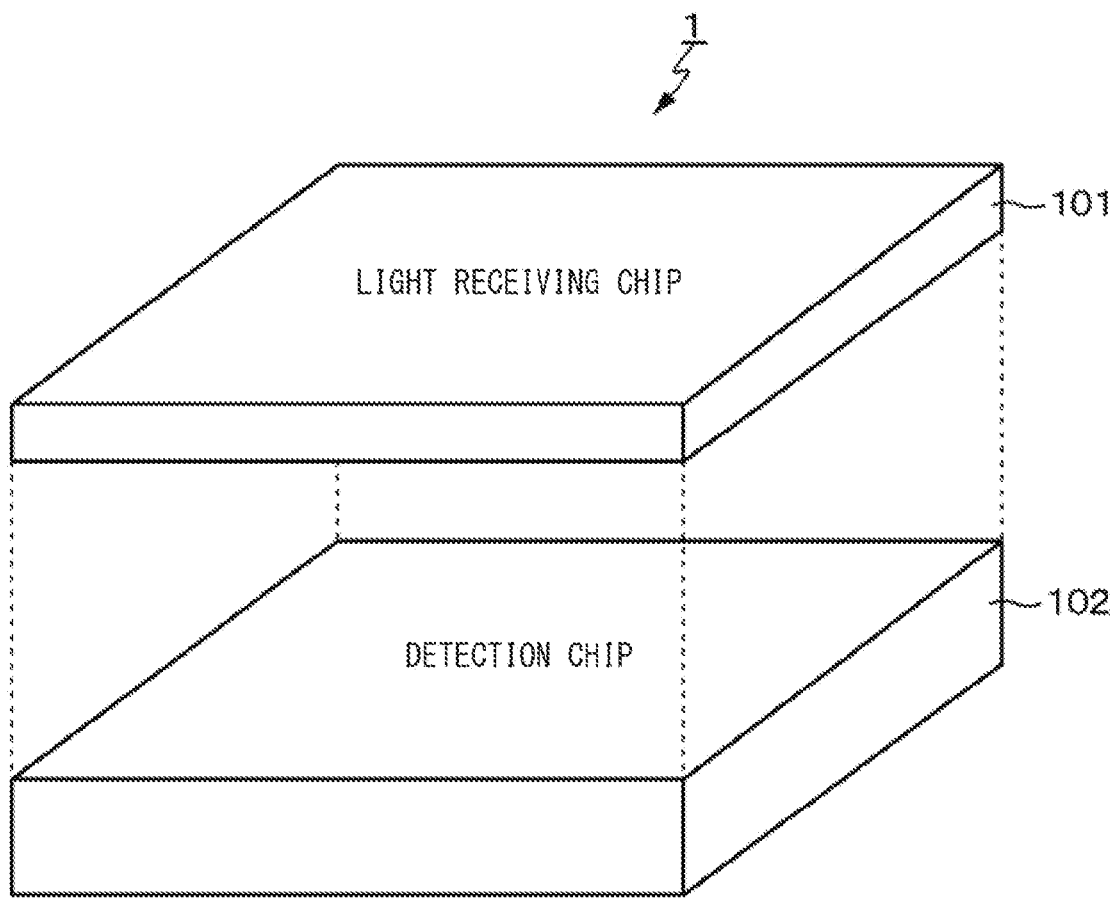
FIG. 9 is an exploded perspective diagram illustrating an outline of a stacked-type chip structure of the event detection sensor.

As a chip (semiconductor integrated circuit) structure of the event detection sensor 10 described above, for example, a stacked-type chip structure is employable. FIG. 9 is an exploded perspective diagram illustrating an outline of the stacked-type chip structure of the event detection sensor 10.

As illustrated in FIG. 9, the stacked-type chip structure, or a so-called stacked structure is a structure in which at least two chips including a light receiving chip 101 as a first chip and a detection chip 102 as a second chip are stacked on each other. In addition, in the circuit configuration of the pixel 11 illustrated in FIG. 5, each of the light receiving elements 611 is disposed on the light receiving chip 101, while all elements other than the light receiving element 611 and elements in other circuit portions of the pixel 11 are disposed on the detection chip 102. The light receiving chip 101 and the detection chip 102 are electrically coupled to each other through a connection part such as a via (VIA), a Cu—Cu junction, or a bump.

It is to be noted that although a description has been given here of a configuration example of disposing the light receiving element 611 on the light receiving chip 101 and disposing elements other than the light receiving element 611 and elements in other circuit portions of the pixel 11 on the detection chip 102 as an example, this configuration example is non-limiting.

For example, in the circuit configuration of the pixel 11 illustrated in FIG. 5, a configuration is employable in which each element of the light receiving section 61 is disposed on the light receiving chip 101 while elements of sections other than the light receiving section 61 and elements in other circuit portions of the pixel 11 are disposed on the detection chip 102. Further, a configuration is employable in which each element of the light receiving section 61, and the reset transistor 621 and the floating diffusion layer 624 of the pixel signal generator 62 are disposed on the light receiving chip 101 while other elements are disposed on the detection chip 102. Furthermore, a configuration is employable in which some of elements included in the event detector 63 are disposed on the light receiving chip 101 together with each element of the light receiving section 61, etc.

[Regarding Necessity for Color Filter]

Incidentally, while a vehicle is traveling, pieces of information in various wavelength bands, including lighting (blinking) of a brake light or taillight of a vehicle traveling in front of the own vehicle, blinking of a direction indicator, a change in color of a traffic light, an electronic sign, etc., come within sight of the driver. Basically, the driver detects these various pieces of information visually and determines the contents thereof. However, it would be very convenient if the event detection sensor 10 is able to perform the detection and determination in the same manner as the driver does.

Thus, in the imaging system 1A according to the present embodiment, a color filter as an example of a wavelength selection element is provided for each of the pixels 11 in the event detection sensor 10 to make it possible to detect an event for each color by performing threshold detection at each of the pixels 11. Then, the motion recognizer 30 illustrated in FIG. 1 performs motion detection, for each color, of an object detected as an event. This makes it possible to utilize the event signal for each color in a corresponding wavelength band in detection (sensing) of lighting (blinking) of the brake light or taillight of a vehicle, blinking of a direction indicator, a change in color of a traffic light, an electronic sign, etc.

Here, a case where a pixel group of two pixels in a horizontal direction (row direction)×two pixels in a vertical direction (column direction), i.e., so-called 2×2 pixels, is employed as units for arrangement of the color filters will be described as an example. However, the 2×2 pixels are one example, and pixel groups to be the units for arrangement of the color filters are thus not limited to the 2×2 pixels.

Figure 10A:
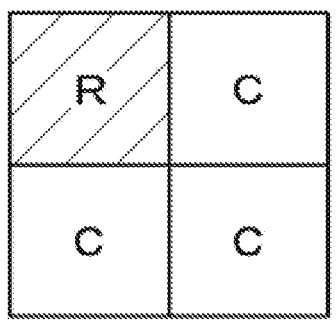
FIGS. 10A and 10B are color filter arrangement diagrams illustrating various arrangement examples of color filters to be provided for the pixels of the event detection sensor.
Figure 10A:
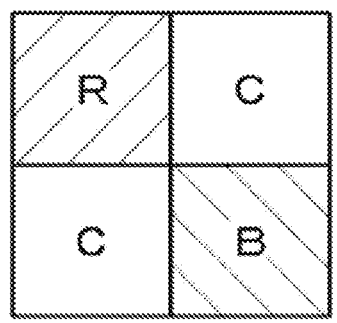
Figure 10A:
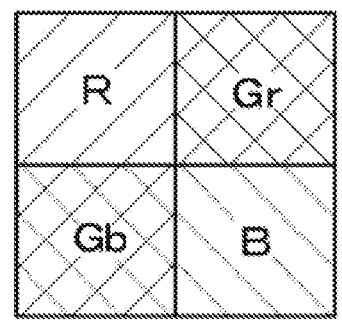

When employing the 2×2 pixels as the units, examples of arrangement of the color filters include an RCCC filter in which an R (red) pixel and C (clear) pixels are combined, an RCCB filter in which a B (blue) pixel is combined with an R pixel and C pixels, and a filter of an RGB Bayer arrangement in which an R pixel, G (green), and B pixels are combined, as illustrated in FIG. 10A. Note that the C (clear) pixel is a pixel provided with no color filter or provided with a transparent filter, and is similar to a W (white) pixel.

Of the above-described three types of arrangement of the color filters, the RCCC filter in which an R (red) pixel and C (clear) pixels are combined, in particular, is able to achieve high sensitivity that allows for imaging of a distant obstacle or person, etc. even at low brightness equivalent to a moonlight night. In addition, the RCCC filter is able to improve accuracy of detection of, for example, light in a red wavelength band (e.g., a taillight, a red traffic light, or the like) that is important in on-vehicle sensing or the like.

Figure 10B:
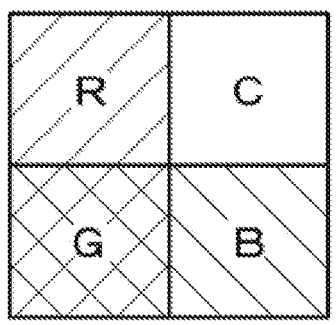
Figure 10B:
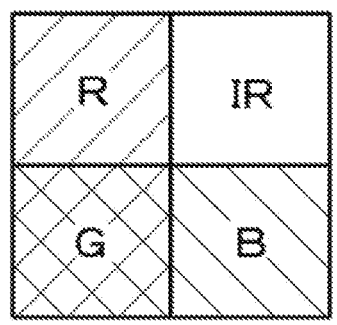
Figure 10B:
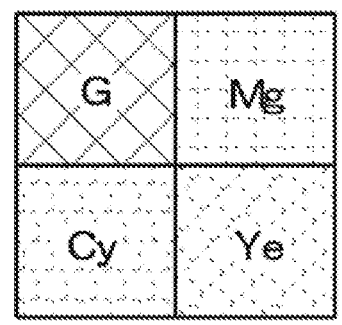

In addition to the three examples illustrated in FIG. 10A, examples of arrangement of the color filters further include an RCGB filter in which an R pixel, a C (clear) pixel, a G pixel, and a B pixel are combined, an RIR (infrared) GB filter in which an R pixel, an IR (infrared) pixel, a G pixel, and a B pixel are combined, and a GMgCyYe filter in which a G pixel, an Mg (magenta) pixel, a Cy (cyan) pixel, and a Ye (yellow) pixel are combined. However, arrangements of the color filters are not limited to the arrangements exemplified in FIGS. 10A and 10B.

[Circuit Configuration Example of Pixels of Four-Pixel Sharing]

Here, a description will be given of a circuit configuration of the pixel 11 with reference to a case where the color filters are arranged in the RGB Bayer arrangement, as an example. Basically, as illustrated in FIG. 5, the pixel signal generator 62 and the event detector 63 are provided in the light receiving section 61 for each pixel 11. However, a circuit configuration is also employable in which the pixel signal generator 62 and the event detector 63 are shared among, for example, four light receiving sections 61, with four pixels in 2×2 pixels as a unit, like a circuit configuration example described below.

Figure 11:
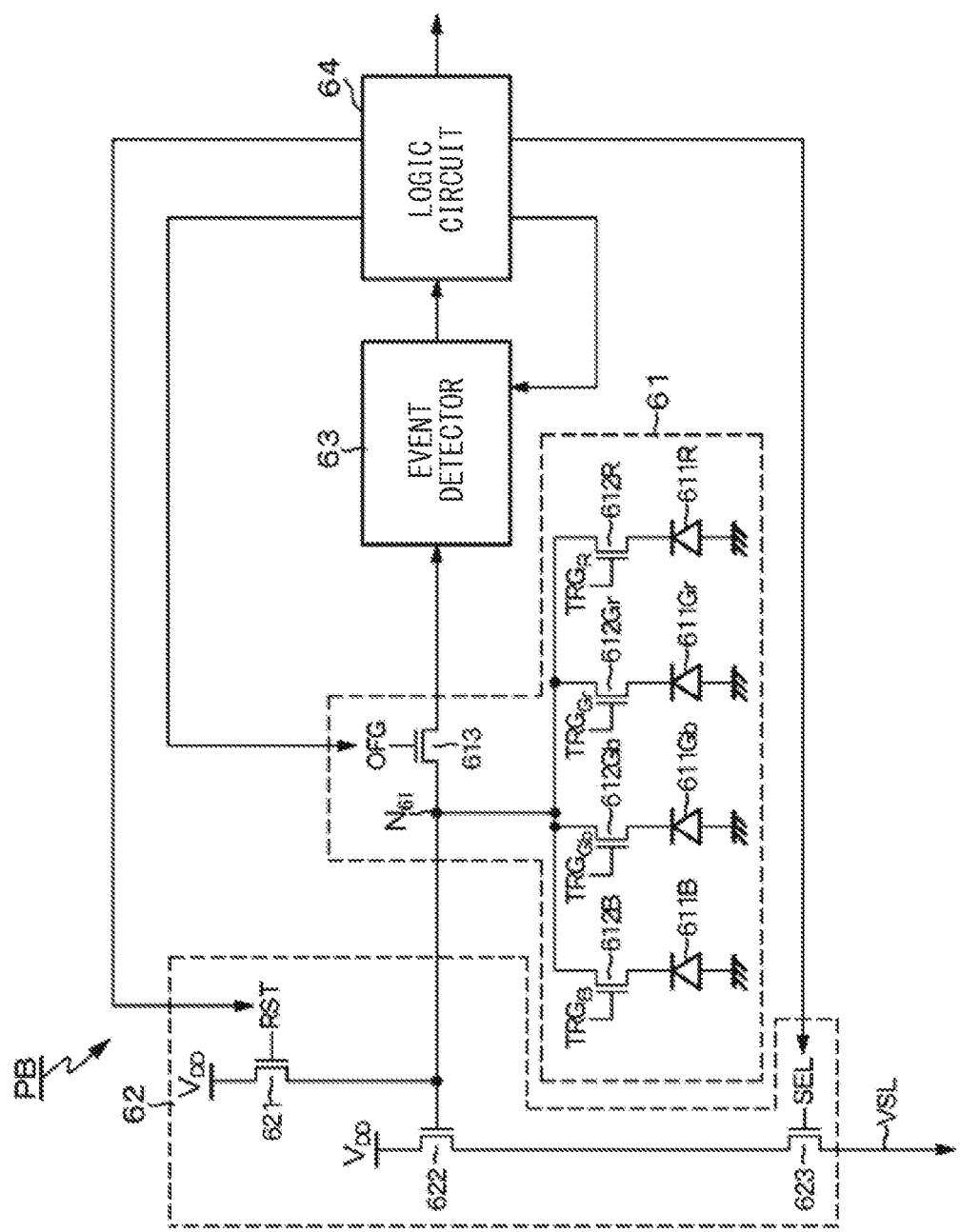
FIG. 11 is a circuit diagram illustrating a circuit configuration example of pixels of four-pixel sharing.

FIG. 11 is a circuit diagram illustrating a circuit configuration example of pixels of the four-pixel sharing. FIG. 11 illustrates a circuit configuration example of a pixel block PB with four pixels in 2×2 pixels as a unit. As illustrated in FIG. 11, the pixel block PB has a configuration including, for example, the light receiving section 61, the pixel signal generator 62, the event detector 63, and a logic circuit 64.

Note that in FIG. 11, the pixel signal generator 62 and the event detector 63 correspond to the pixel signal generator 62 and the event detector 63 in FIG. 5, and are similar thereto in basic circuit configuration. Thus, detailed descriptions thereof will be omitted. The logic circuit 64 includes the driving section 13, the signal processing section 16, and the arbiter section 14 in FIG. 3.

In the case where the color filters are arranged in the RGB Bayer arrangement, the light receiving section 61 for the four-pixel sharing includes a light receiving element 611R with a red (R) color filter, a light receiving element 611Gr with a green (Gr) color filter, a light receiving element 611Gb with a green (Gb) color filter, and a light receiving element 611B with a blue (B) color filter. The light receiving section 61 further includes four transfer transistors 612R, 612Gr, 612Gb, and 612B provided respectively for the four light receiving elements 611R, 611Gr, 611Gb, and 611B, and the transfer transistor 613 provided in common for the four light receiving elements 611R, 611Gr, 611Gb, and 611B.

Transfer signals $TRG_R$, $TRG_{Gr}$, $TRG_{Gb}$, and $TRG_B$ are supplied from the driving section 13 of the logic circuit 64 to respective gate electrodes of the four transfer transistors 612R, 612Gr, 612Gb, and 612B. The control signal OFG is supplied from the driving section 13 to the gate electrode of the transfer transistor 613. Signals outputted from the light receiving elements 611R, 611Gr, 611Gb, and 611B via the transfer transistors 612R, 612Gr, 612Gb, and 612B are integrated at a node $N_{61}$. The node $N_{61}$ is coupled to an output end of the pixel signal generator 62 and to an input end of the event detector 63 via the transfer transistor 613.

In the circuit configuration example of pixels of the four-pixel sharing having the above-described configuration, for example, in a case of detecting a change in luminance (detecting an event) of the light receiving element 611R provided with a red (R) color filter, it is sufficient that only the transfer transistor 612R is brought into conduction. Further, by bringing all the transfer transistors 612R, 612Gr, 612Gb, and 612B sequentially after detecting the event of red (R), it is possible to detect a luminance value of the detected event with higher accuracy, for example. It is thus possible for the event detection sensor 10 to perform not only event detection but also image acquisition.

According to the above-described circuit configuration example, the pixel signal generator 62 and the event detector 63 are shared among the four light receiving sections 61 with four pixels in 2×2 pixels as a unit, for example. It is therefore possible to achieve reduction in circuit scale of the pixel 11 as compared with a case where no pixel sharing is employed.

In the following, a description is given of specific examples in which in the imaging system 1A according to the first embodiment, an event is detected in a specific wavelength band from information of the pixels 11 provided with the color filters, and predetermined signal processing is performed on the basis of the detection result. It is to be noted that processes in each of Examples described below are basically executed under the control by the controller 50 in the imaging system 1A illustrated in FIG. 1.

Example 1

Figure 12:
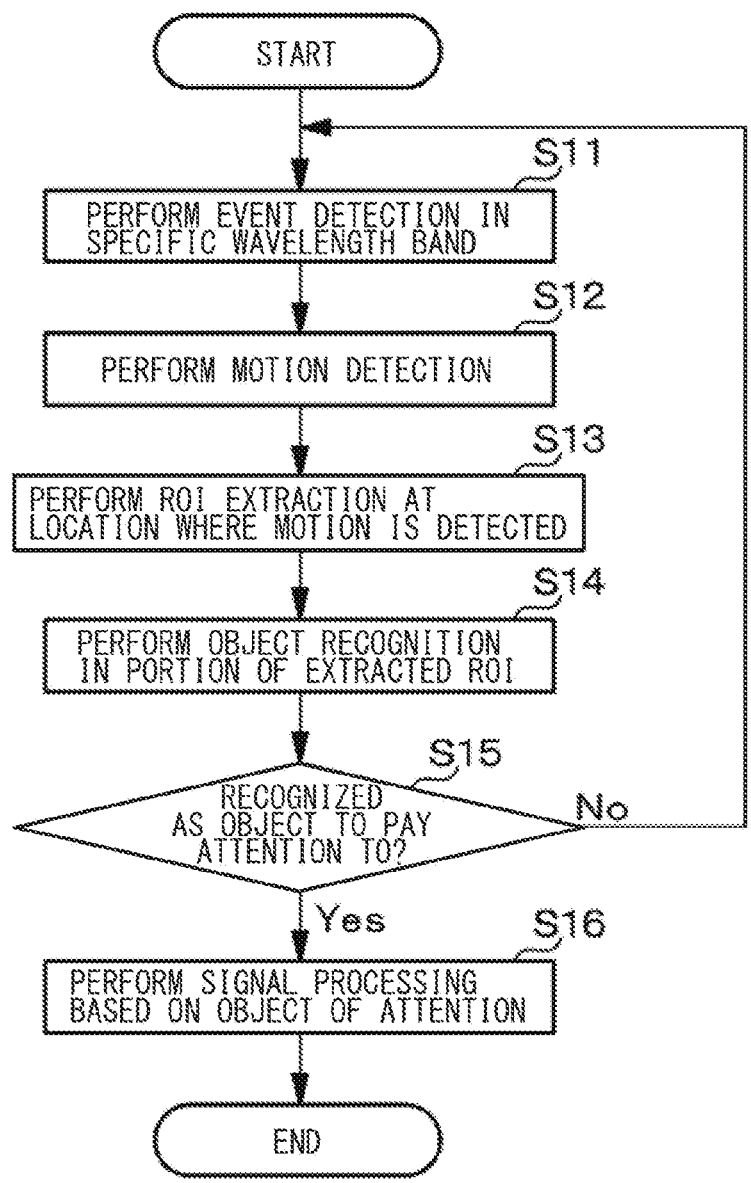
FIG. 12 is a flowchart illustrating a flow of processes of a most generic concept according to Example 1.

Example 1 is an example of processes of a most generic concept of the first embodiment. A flow of the processes of the most generic concept according to Example 1 is illustrated in a flowchart of FIG. 12.

During traveling of a vehicle equipped with the imaging system 1A according to the first embodiment, the controller 50 performs event detection in a specific wavelength band (step S11) on the basis of a signal of the pixel 11 provided with a filter for the specific wavelength band, and subsequently performs, at the motion recognizer 30 illustrated in FIG. 1, motion detection on an object detected as an event (step S12).

Next, the controller 50 performs, at the ROI extractor 41 illustrated in FIGS. 2A and 2B, extraction of a specific region ROI for performing object recognition at a location where the motion is detected (step S13), and subsequently performs, at the recognition processing section 42 illustrated in FIGS. 2A and 2B, object recognition in a portion of the extracted ROI (step S14).

Next, the controller 50 determines whether or not the object is recognized as an object to pay attention to (step S15) by the object recognition. In a case where the object is not recognized as an object to pay attention to (No in S15), the controller 50 returns to step S11. In a case where the object is recognized as an object to pay attention to (Yes in S15), the controller 50 executes predetermined signal processing based on the object to pay attention to (step S16), and ends the series of processes of the most generic concept according to Example 1.

As described above, in Example 1, event detection is performed in a specific wavelength band and motion detection is performed on the object detected as an event. In a case where the object is recognized as an object to pay attention to, predetermined signal processing based on that object is performed. It is thereby possible to detect pieces of information in various wavelength bands as events. Specifically, while pieces of information in various wavelength bands, including lighting (blinking) of a brake light or taillight of a vehicle traveling in front of the own vehicle, blinking of a direction indicator, a change in color of a traffic light, an electronic sign, etc., come within sight of the driver during traveling of the vehicle, the imaging system A is able to perform detection thereof and determination thereon in the same manner as the driver does.

Figure 29:
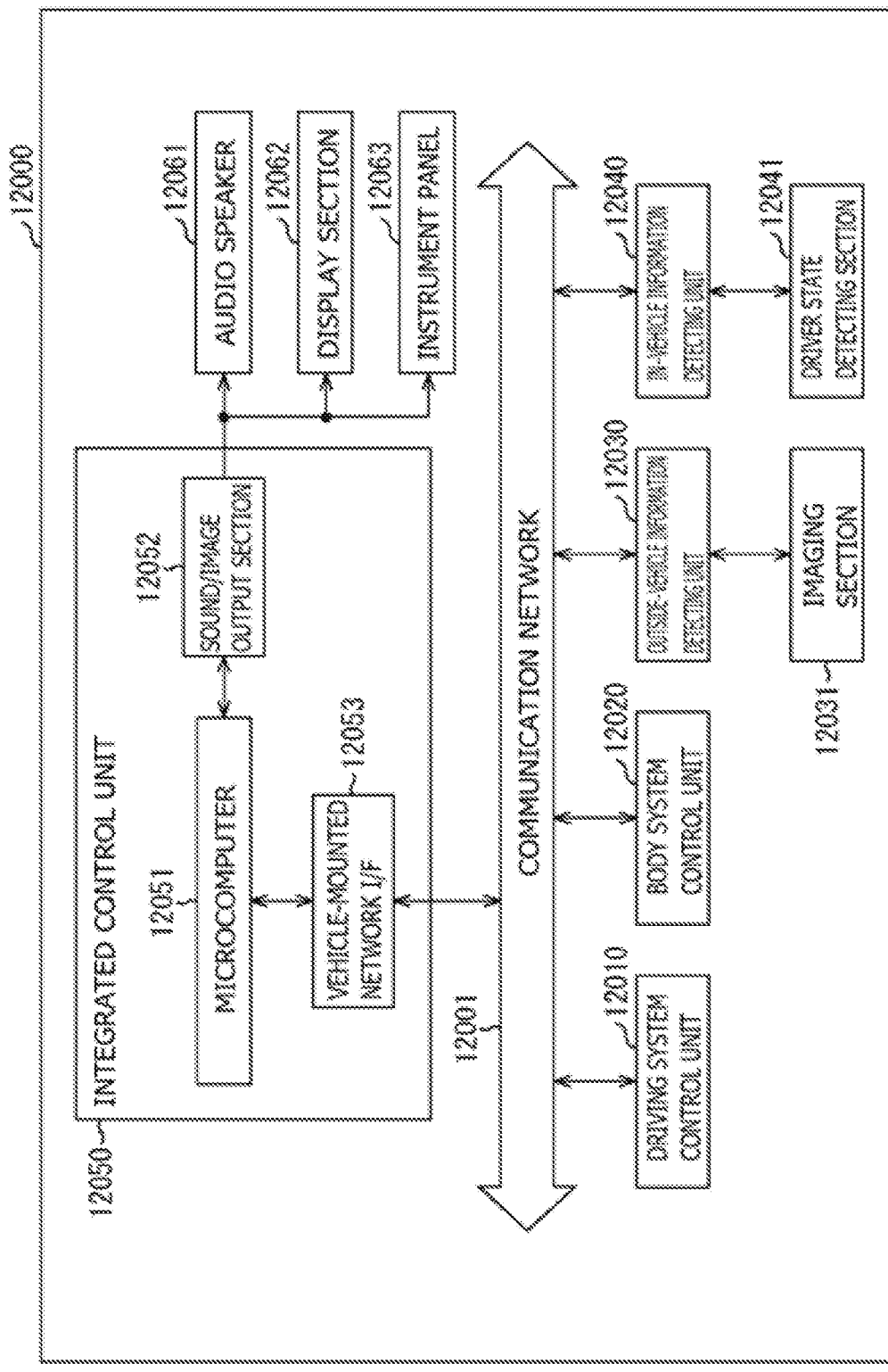
FIG. 29 is a block diagram illustrating a schematic configuration example of a vehicle control system that is an example of a mobile body control system to which the technology according to the present disclosure is applicable.

Here, the "predetermined signal processing" refers to a process of transmitting a command signal for various kinds of automatic control, etc. to, for example, a driving system control unit 12010 of the vehicle control system 12000 illustrated in FIG. 29, for example. Upon receiving the command signal from the event detection sensor 10, the vehicle control system 12000 automatically performs various kinds of control, such as applying brakes by automatic control or calling the driver's attention by displaying an alert.

Example 2

Figure 13:
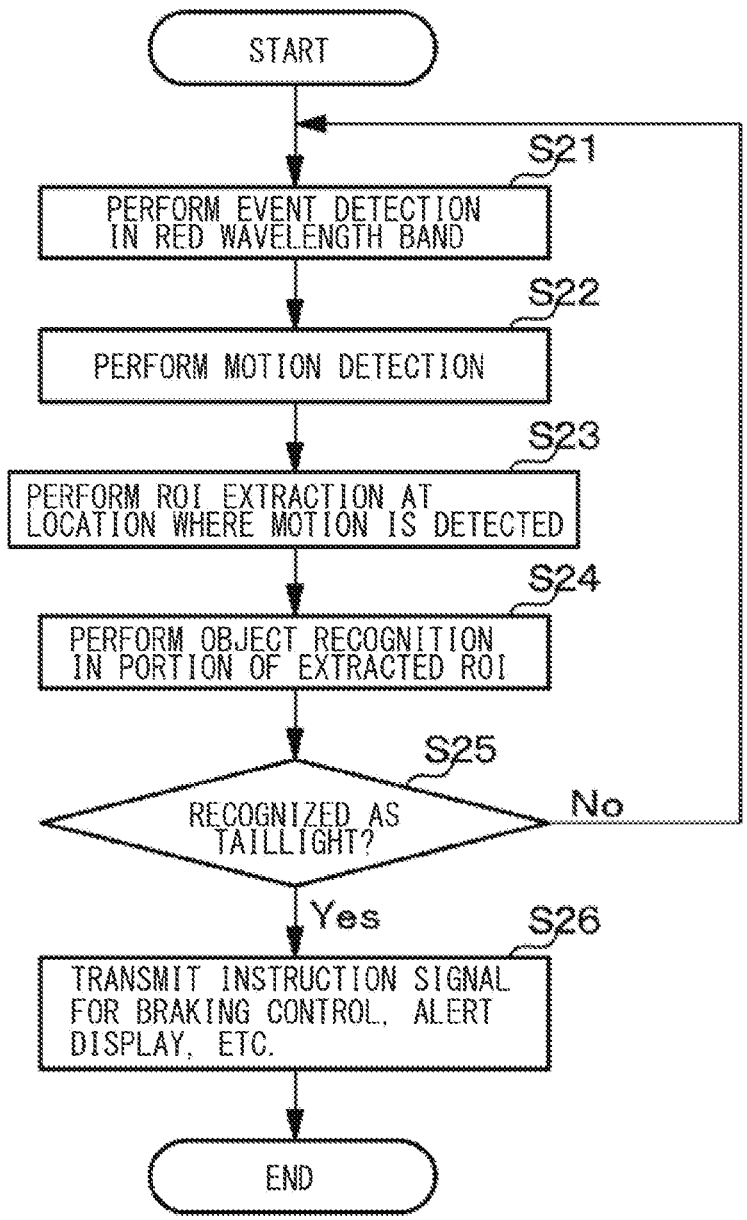
FIG. 13 is a flowchart illustrating a flow of processes for sensing of a taillight according to Example 2.

Example 2 is an example of sensing a taillight of a vehicle traveling in front of an own vehicle. A flow of processes for taillight sensing according to Example 2 is illustrated in a flowchart of FIG. 13. In Example 2, for example, the RCCC filter illustrated in FIG. 10A is used as the color filter to be provided for each pixel 11 in the event detection sensor 10. In the case of the RCCC filter, red (R) serves as the specific wavelength band. The same applies to examples to be described later.

During traveling of the vehicle equipped with the imaging system 1A according to the first embodiment, the controller 50 performs event detection in the red wavelength band (step S21), and subsequently performs, at the motion recognizer 30, motion detection on the object detected as an event (step S22). Next, the controller 50 performs, at the ROI extractor 41, extraction of the ROI at a location where the motion is detected (step S23), and subsequently performs, at the recognition processing section 42, object recognition in a portion of the extracted ROI (step S24).

Next, the controller 50 determines whether or not the object is recognized as a taillight of a vehicle traveling in front of the own vehicle (step S25) by the object recognition. In a case where the object is not recognized as a taillight (No in S25), the controller 50 returns to step S21. In a case where the object is recognized as a taillight (Yes in S25), the controller 50 transmits an instruction signal for braking control, alert display, or the like to the driving system control unit 12010 of the vehicle control system 12000 illustrated in FIG. 29 via the interface 80 illustrated in FIG. 1 (step S26). Then, the series of processes for taillight sensing according to Example 2 is ended.

Upon receiving the instruction signal for braking control, alert display, or the like from the imaging system 1A according to the first embodiment, the driving system control unit 12010 of the vehicle control system 12000 performs control such as applying brakes by automatic control or calling the driver's attention by displaying an alert.

As described above, in Example 2, event detection is performed in the red wavelength band and motion detection is performed on the object detected as an event. In the case where the object is recognized as the taillight of the vehicle traveling in front of the own vehicle, it is determined that an inter-vehicle distance between the own vehicle and the other vehicle traveling in front of the own vehicle is close enough to be able to recognize the taillight of the other vehicle. Then, the instruction signal for braking control, alert display, or the like is transmitted to the driving system control unit 12010 of the vehicle control system 12000. The vehicle control system 12000 is thereby able to perform control such as applying brakes by automatic control or calling the driver's attention by displaying an alert, thus being able to contribute to safe traveling.

It is to be noted that in Example 2, the object is recognized as a taillight by object recognition at the time of the recognition process on the taillight; however, flicker of the taillight may be detected and used as information in object recognition (object sensing).

Example 3

Example 3 is an example of sensing a taillight after recognizing a vehicle traveling in front of an own vehicle. A flow of processes for vehicle recognition and taillight sensing according to Example 3 is illustrated in a flowchart of FIG. 14.

During traveling of the vehicle equipped with the imaging system 1A according to the first embodiment, the controller 50 performs event detection in all wavelength bands (step S31), and subsequently performs, at the motion recognizer 30, motion detection on the object detected as an event (step S32). Next, the controller 50 performs, at the ROI extractor 41, extraction of the ROI at a location where the motion is detected (step S33), and subsequently performs, at the recognition processing section 42, object recognition in a portion of the extracted ROI (step S34).

Next, the controller 50 determines whether or not the object is recognized as a vehicle traveling in front (step S35) by the object recognition. In a case where the object is not recognized as a vehicle (No in S35), the controller 50 returns to step S31. In a case where the object is recognized as a vehicle (Yes in S35), the controller 50 extracts a red event signal area within an area where the object is recognized as a vehicle (step S36).

Next, the controller 50 determines whether or not the object is recognized as a taillight (step S37) by object recognition at the recognition processing section 42. In a case where the object is not recognized as a taillight (No in S37), the controller 50 returns to step S36. In a case where the object is recognized as a taillight (Yes in S37), the controller 50 transmits an instruction signal for braking control, alert display, or the like to the driving system control unit 12010 of the vehicle control system 12000 illustrated in FIG. 29 via the interface 80 (step S38). Then, the series of processes for vehicle recognition and taillight sensing according to Example 3 is ended.

Upon receiving the instruction signal for braking control, alert display, or the like from the imaging system 1A according to the first embodiment, the driving system control unit 12010 of the vehicle control system 12000 performs control such as applying brakes by automatic control or calling the driver's attention by displaying an alert.

As described above, in Example 3, event detection is performed in all the wavelength bands and motion detection is performed on the object detected as an event. After recognition of a vehicle traveling in front of the own vehicle, a recognition process on a taillight is performed. This makes it possible to increase the accuracy of recognition of the taillight as compared with the case of Example 2 where the taillight of the vehicle traveling in front of the own vehicle is directly recognized.

It is to be noted that in Example 3, the object is recognized as a taillight by object recognition at the time of the recognition process on the taillight; however, flicker of the taillight may be detected and used as information in object recognition (object sensing).

Example 4

Figure 15:
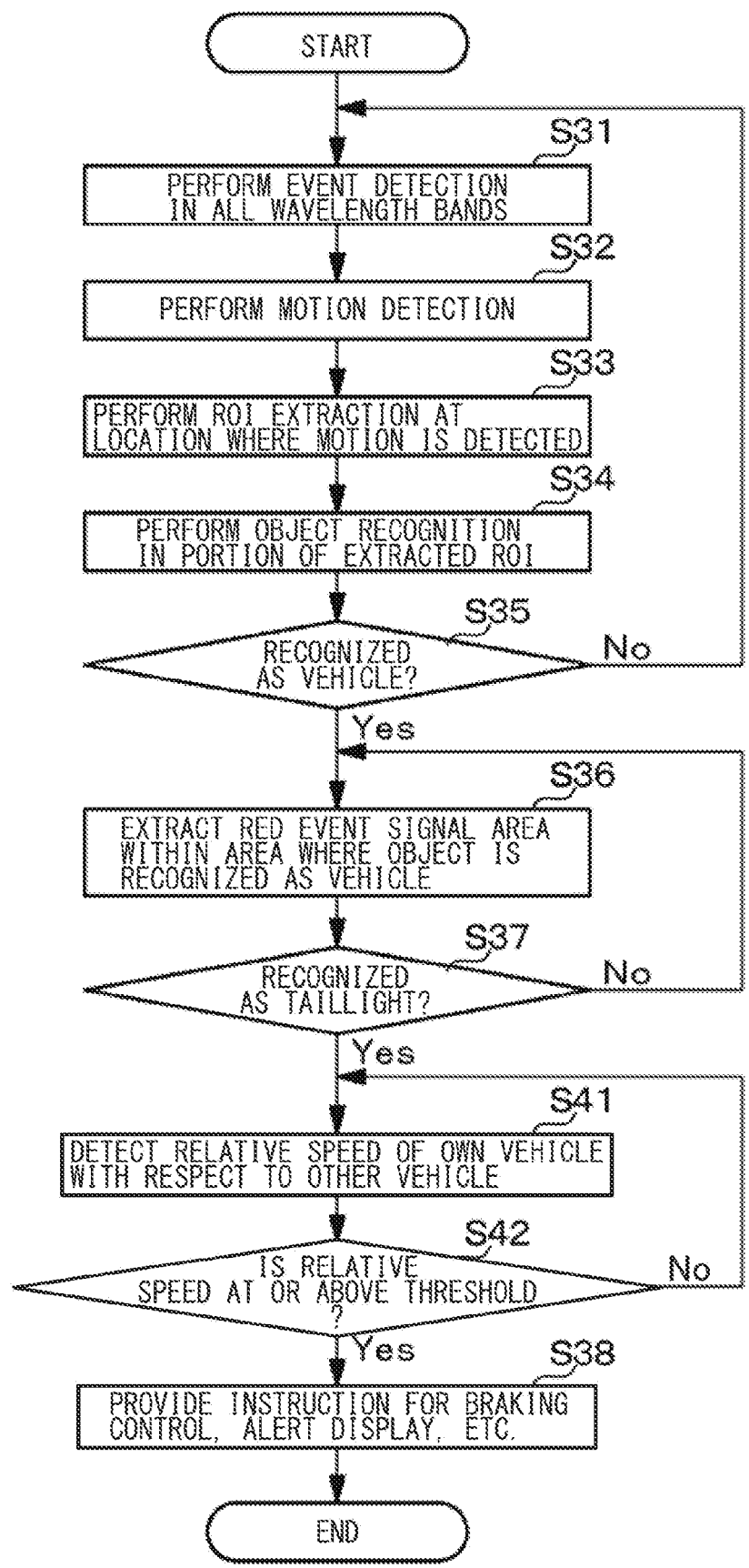
FIG. 15 is a flowchart illustrating a flow of processes for recognition of a vehicle and sensing of a direction indicator according to Example 4.

Example 4 is a modification example of Example 3, and is an example of detecting a relative speed of the own vehicle and another vehicle (a vehicle traveling in front of the own vehicle) upon recognizing a taillight. A flow of processes for vehicle recognition and taillight sensing according to Example 4 is illustrated in a flowchart of FIG. 15.

Figure 14:
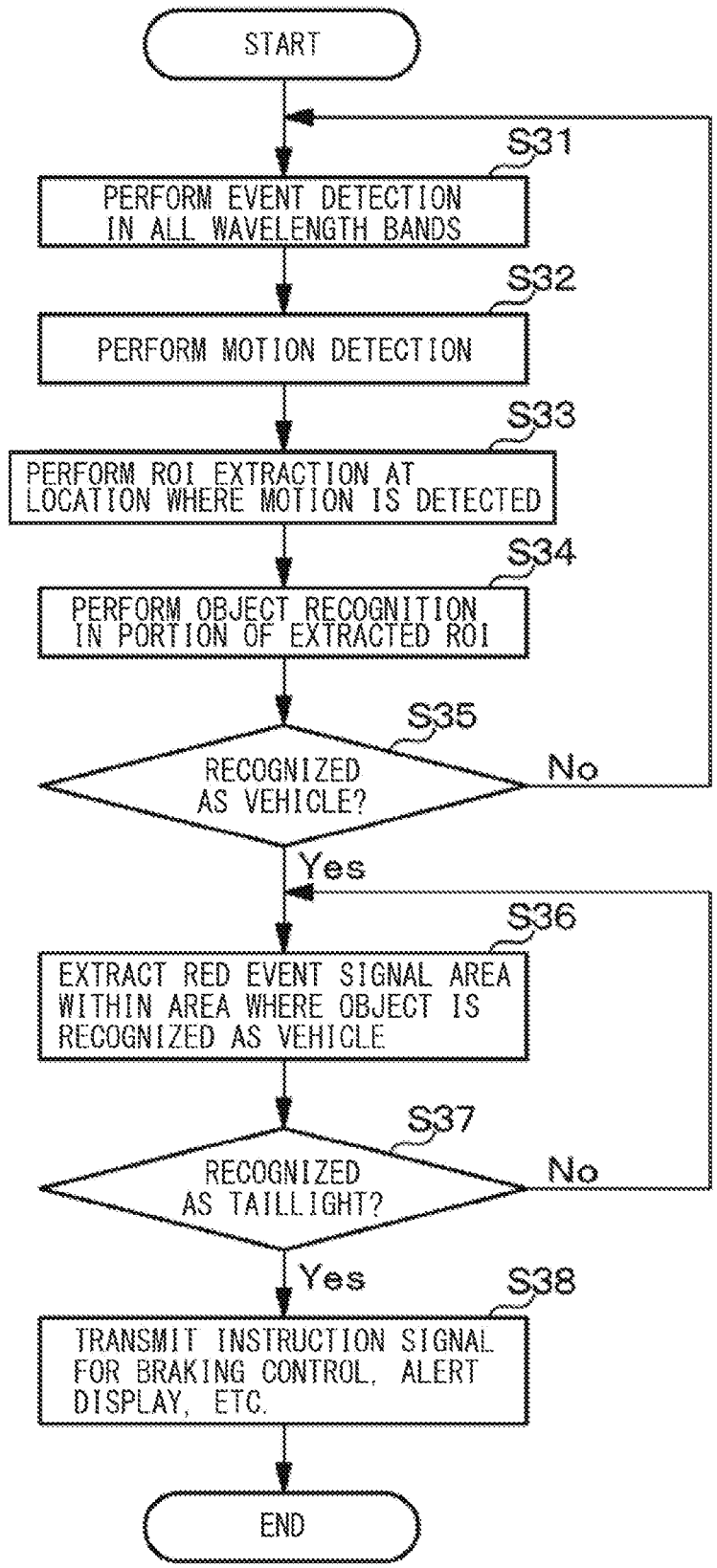
FIG. 14 is a flowchart illustrating a flow of processes for recognition of a vehicle and sensing of a taillight according to Example 3.

Example 4 includes the processes in the flowchart of Example 3 illustrated in FIG. 14, with step S41 and step S42 interposed between step S37 and step S38. Upon recognizing the object as a taillight in step S37 (Yes in S37), the controller 50 detects/calculates the relative speed of the own vehicle and the other vehicle (the vehicle traveling in front of the own vehicle) (step S41), and subsequently determines whether or not the relative speed is at or above a predetermined threshold (relative speed) (step S42).

In a case where the relative speed is less than the predetermined threshold (No in S42), the controller 50 returns to step S41. In a case where the relative speed is at or above the predetermined threshold (Yes in S42), the controller 50 transmits an instruction signal for braking control, alert display, or the like to the driving system control unit 12010 of the vehicle control system 12000 illustrated in FIG. 29 via the interface 80 (step S38). Then, the series of processes for vehicle recognition and taillight sensing according to Example 4 is ended.

As described above, in Example 4, upon recognizing the taillight of the vehicle (other vehicle) traveling in front of the own vehicle, the relative speed of the own vehicle and the other vehicle is detected/calculated. In the case where the relative speed is at or above the predetermined threshold, it is determined that there is a possibility of the own vehicle rapidly approaching the vehicle traveling in front. This allows for greater contribution to safe traveling as compared with the case of Example 3 where the relative speed is not detected.

Example 5

Figure 16:
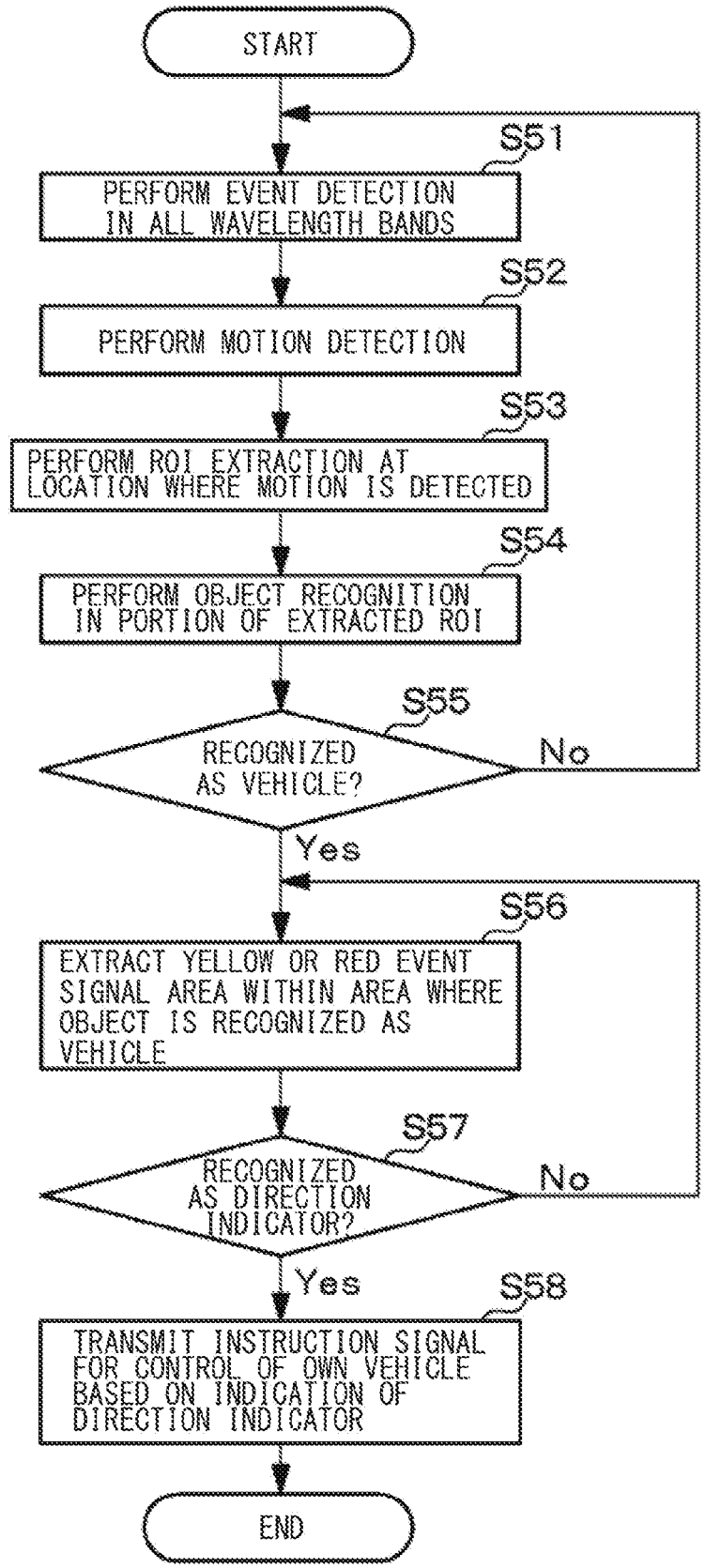
FIG. 16 is a flowchart illustrating a flow of processes for recognition of a vehicle and sensing of a direction indicator according to Example 5.

Example 5 is an example of sensing a direction indicator (blinker) after recognizing a vehicle traveling in front of an own vehicle. A flow of processes for vehicle recognition and direction-indicator sensing according to Example 5 is illustrated in a flowchart of FIG. 16.

During traveling of the vehicle equipped with the imaging system 1A according to the first embodiment, the controller 50 performs event detection in all wavelength bands (step S51), and subsequently performs, at the motion recognizer 30, motion detection on the object detected as an event (step S52). Next, the controller 50 performs, at the ROI extractor 41, extraction of the ROI at a location where the motion is detected (step S53), and subsequently performs, at the recognition processing section 42, object recognition in a portion of the extracted ROI (step S54).

Next, the controller 50 determines whether or not the object is recognized as a vehicle traveling in front (step S55) by the object recognition. In a case where the object is not recognized as a vehicle (No in S55), the controller 50 returns to step S51. In a case where the object is recognized as a vehicle (Yes in S55), the controller 50 extracts a yellow or red event signal area within an area where the object is recognized as a vehicle (step S56).

Next, the controller 50 determines whether or not the object is recognized as a direction indicator (step S57) by object recognition at the recognition processing section 42. In a case where the object is not recognized as a direction indicator (No in S57), the controller 50 returns to step S56. In a case where the object is recognized as a direction indicator (Yes in S57), the controller 50 transmits an instruction signal for performing controlling of the own vehicle based on the content of indication of the direction indicator to the driving system control unit 12010 of the vehicle control system 12000 illustrated in FIG. 29 via the interface 80 (step S58). Then, the series of processes for vehicle recognition and direction-indicator sensing according to Example 5 is ended.

As described above, in Example 5, event detection is performed in all the wavelength bands and motion detection is performed on the object detected as an event. After recognition of the vehicle traveling in front of the own vehicle, a recognition process is performed on a direction indicator in an area where the vehicle has been recognized. Then, the instruction signal for performing controlling of the own vehicle based on the content of indication of the direction indicator (right turn, left turn, or hazard) is transmitted to the driving system control unit 12010 of the vehicle control system 12000.

Here, for example, when the vehicle in front provides a direction indication of a right turn, it follows that the vehicle traveling in front of the own vehicle will become no longer present in front because of the right turn. Accordingly, controlling the driving system control unit 12010 of the vehicle control system 12000 to increase the vehicle speed is conceivable as "controlling of the own vehicle based on the content of indication of the direction indicator". Alternatively, when the direction indicator of the vehicle in front indicates a hazard (flashing display), there is a high possibility that the vehicle traveling in front will stop. Accordingly, controlling the driving system control unit 12010 of the vehicle control system 12000 to automatically apply breaks is conceivable, for example.

It is to be noted that in Example 5, the object is recognized as a direction indicator by object recognition at the time of the recognition process on the direction indicator; however, flicker of the direction indicator may be detected and used as information in object recognition (object sensing).

Example 6

Example 6 is an example of recognizing a traffic light and sensing a red light. A flow of processes for traffic-light recognition and red-light sensing according to Example 6 is illustrated in a flowchart of FIG. 17.

During traveling of the vehicle equipped with the imaging system 1A according to the first embodiment, the controller 50 performs event detection in all wavelength bands (step S61), and subsequently performs, at the motion recognizer 30, motion detection on the object detected as an event (step S62). Next, the controller 50 performs, at the ROI extractor 41, extraction of the ROI at a location where the motion is detected (step S63), and subsequently performs, at the recognition processing section 42, object recognition in a portion of the extracted ROI (step S64).

Next, the controller 50 determines whether or not the object is recognized as a traffic light (step S65) by the object recognition. In a case where the object is not recognized as a traffic light (No in S65), the controller 50 returns to step S61. In a case where the object is recognized as a traffic light (Yes in S65), the controller 50 extracts a red event signal area within an area where the object is recognized as a traffic light (step S66).

Next, the controller 50 determines whether or not the content of indication of the traffic light is recognized as a red light (step S67) by object recognition at the recognition processing section 42. In a case where the content of indication is not recognized as a red light (No in S67), the controller 50 returns to step S66. In a case where the content of indication is recognized as a red light (Yes in S67), the controller 50 transmits an instruction signal for braking control, alert display, or the like to the driving system control unit 12010 of the vehicle control system 12000 illustrated in FIG. 29 via the interface 80 (step S68). Then, the series of processes for traffic-light recognition and red-light sensing according to Example 6 is ended.

As described above, in Example 6, event detection is performed in all the wavelength bands and motion detection is performed on the object detected as an event. In a case where the object is a traffic light and the content of indication thereof is a red light, the instruction signal for braking control, alert display, or the like is transmitted to the driving system control unit 12010 of the vehicle control system 12000. The vehicle control system 12000 is thereby able to perform control such as applying brakes by automatic control or calling the driver's attention by displaying an alert, thus being able to contribute to safe traveling.

It is to be noted that in Example 6, the object is recognized as a traffic light by object recognition at the time of the recognition process on the traffic light; however, flicker information (e.g., frequency, duty ratio, etc.) of the traffic light may be detected and used as information in object recognition (object sensing).

Example 7

Figure 18:
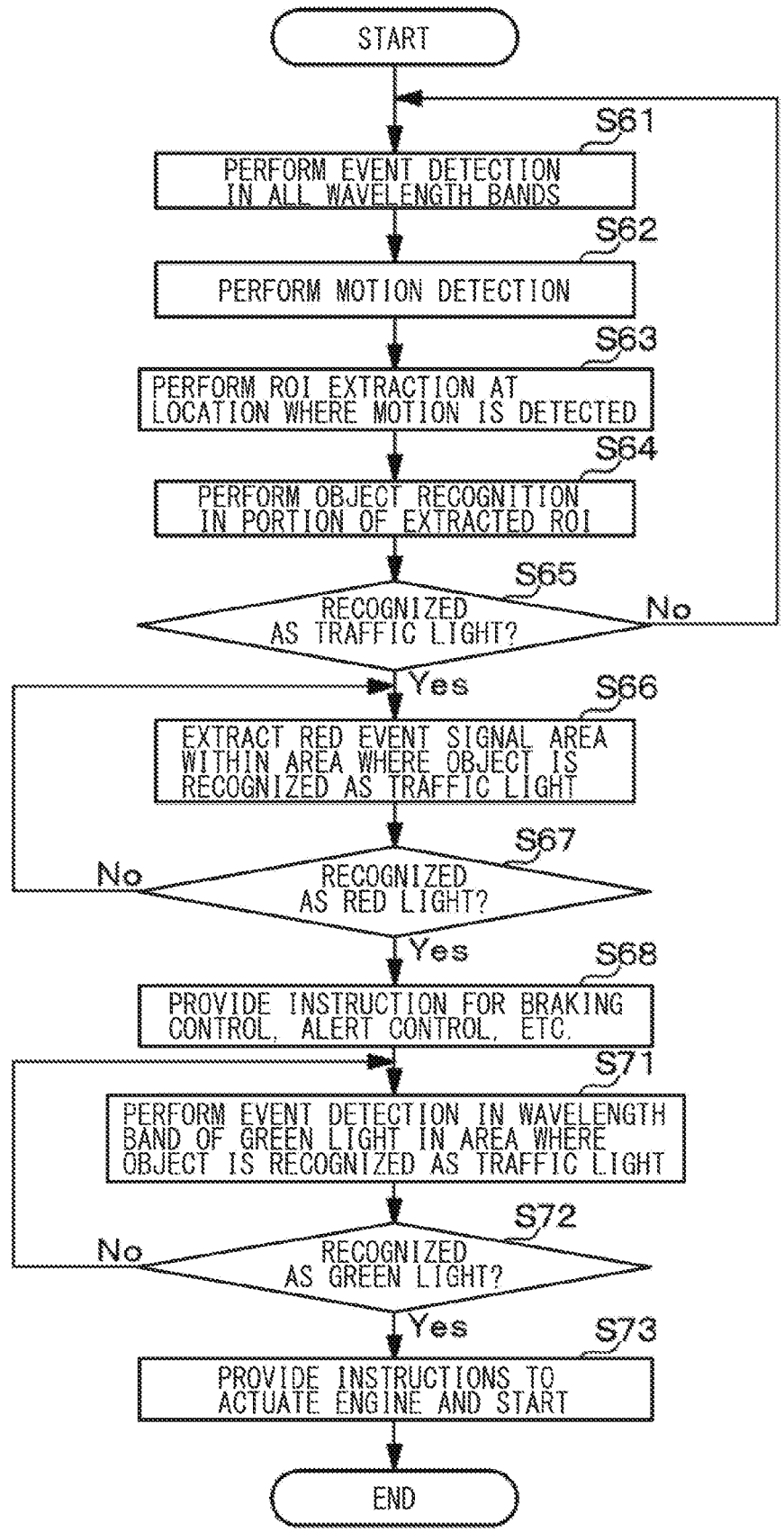
FIG. 18 is a flowchart illustrating a flow of processes for recognition of a traffic light and sensing of a change from a red light to a green light according to Example 7.

Example 7 is a modification example of Example 6, and is an example of sensing a change in the traffic light from a red light to a green light. A flow of processes for traffic-signal recognition and sensing of the change from the red light to the green light according to Example 7 is illustrated in a flowchart of FIG. 18.

Figure 17:
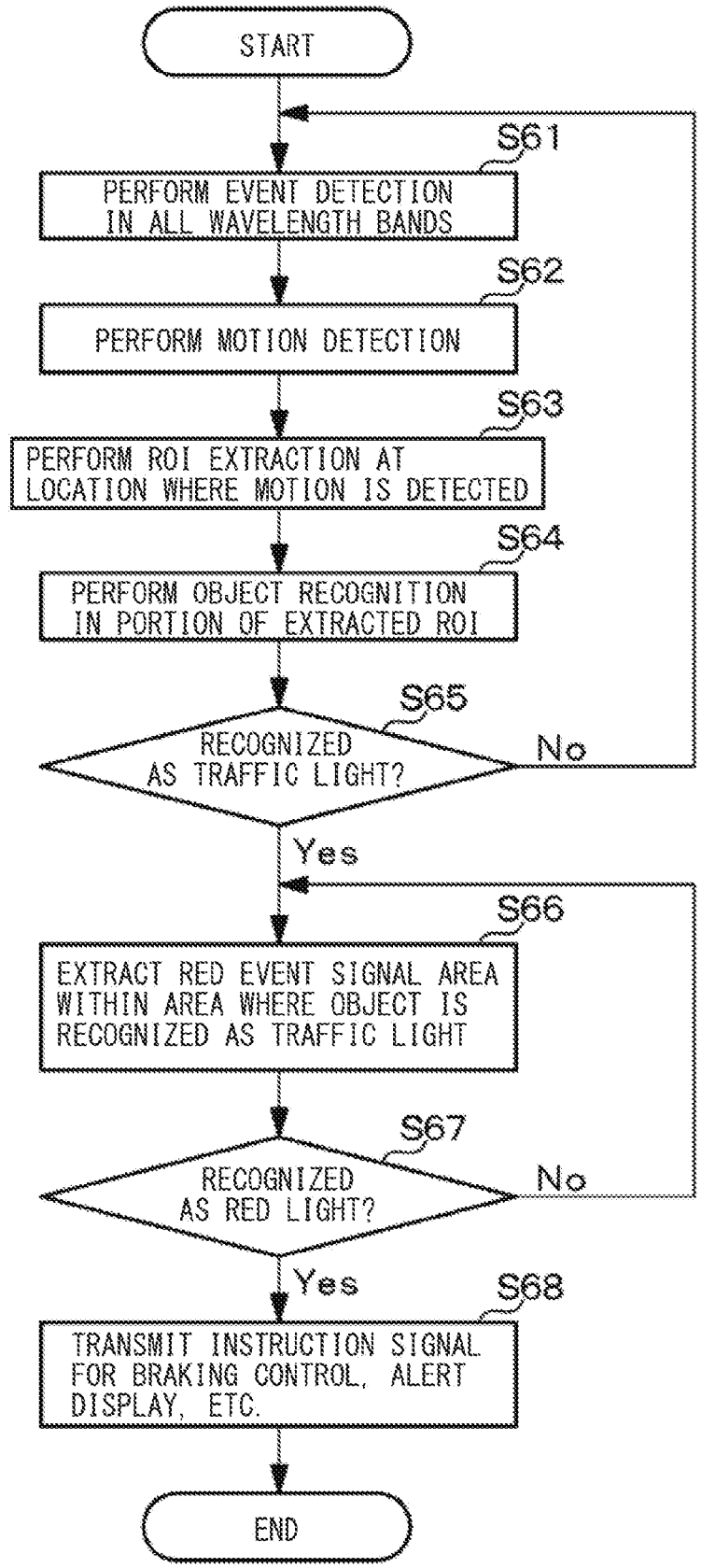
FIG. 17 is a flowchart illustrating a flow of processes for recognition of a traffic light and sensing of a red light according to Example 6.

Example 7 includes the processes in the flowchart of Example 6 illustrated in FIG. 17, with step S71 to step S73 introduced thereinto as processes after step S78. Upon recognizing as a red light and transmitting the instruction signal for braking control, alert display, or the like (step S68), the controller 50 performs event detection in the wavelength band of a green light in the area where the object is recognized as a traffic light (step S71), and subsequently determines whether or not the traffic light is recognized as a green light (step S72).

In a case where the traffic light is not recognized as a green light (No in S72), the controller 50 returns to step S61. In a case where the traffic light is recognized as a green light (Yes in S72), the controller 50 transmits an instruction signal for instructing to actuate engine, to start, etc. to the driving system control unit 12010 of the vehicle control system 12000 via the interface 80 (step S73). Then, the series of processes for traffic-signal recognition and sensing of the change from a red light to a green light according to Example 7 is ended.

As described above, in Example 7, when the traffic light in the state of a red light has changed from the red light to the green light, the instruction signal for instructing to actuate engine, to start, etc. is transmitted to the driving system control unit 12010 of the vehicle control system 12000. The vehicle control system 12000 is thereby able to perform control to automatically actuate engine and start the vehicle, thus making it possible to prevent the occurrence of problems such as delayed start due to overlooking of the traffic light.

It is to be noted that when recognizing as a change in the traffic light from the red light to the green light, the threshold for blue or green may be set to a low value in the area where the object is recognized as a traffic light and to a high value in other areas to thereby allow only the green light to be detectable.

Second Embodiment of Present Disclosure

<Configuration Example of Imaging System According to Second Embodiment>

Figure 19:
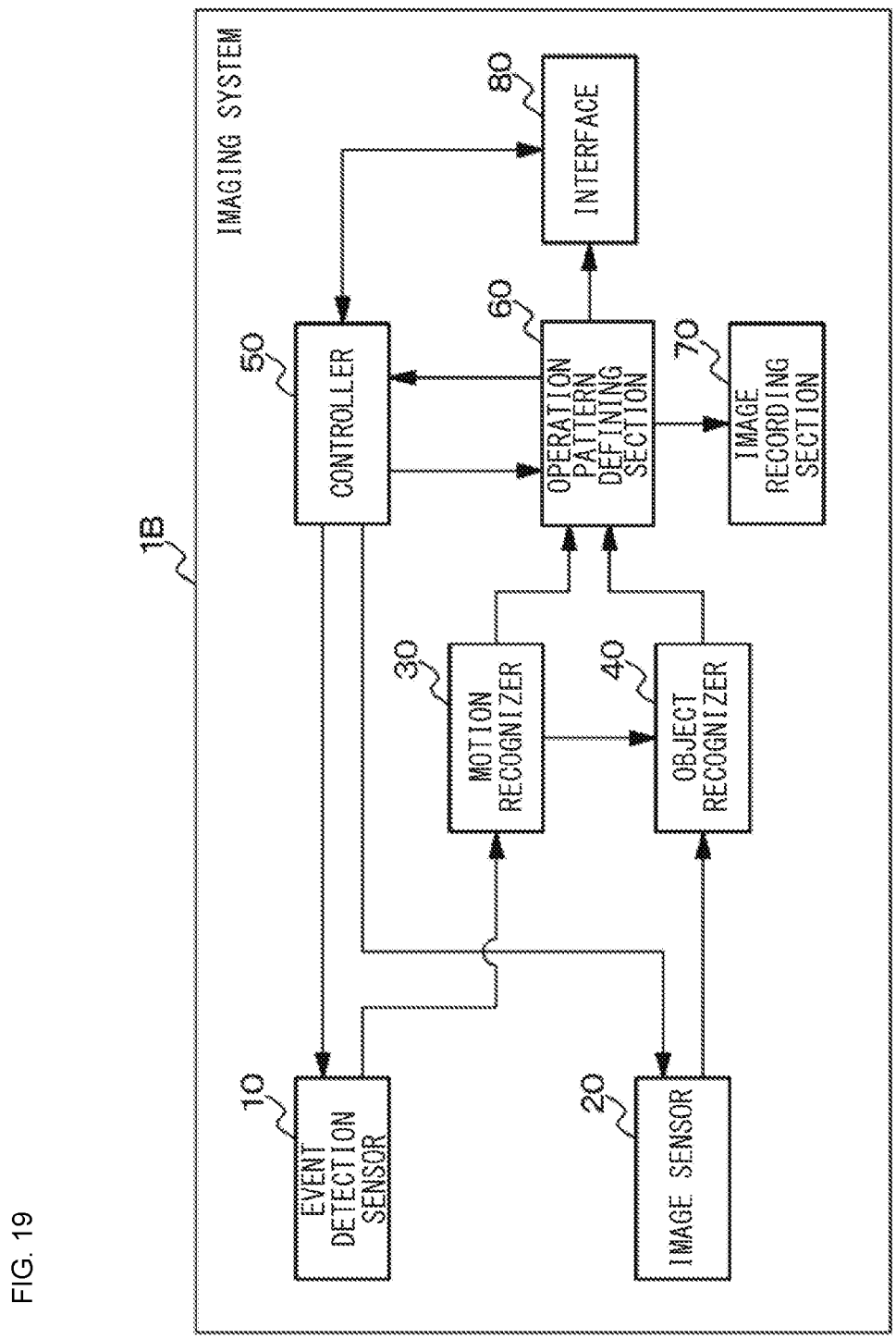
FIG. 19 is a block diagram illustrating an example of a system configuration of an imaging system according to a second embodiment of the present disclosure.

FIG. 19 is a block diagram illustrating an example of a system configuration of an imaging system according to a second embodiment of the present disclosure.

As illustrated in FIG. 19, the imaging system 1B according to the second embodiment of the present disclosure has a configuration including the event detection sensor 10, an image sensor 20, the motion recognizer 30, the object recognizer 40, the controller 50, the operation pattern defining section 60, and the recording section 70.

The functions, etc. of the event detection sensor 10, the motion recognizer 30, the object recognizer 40, the controller 50, the operation pattern defining section 60, and the recording section 70 are as described in the imaging system 1A according to the first embodiment. It is to be noted that the event detection sensor 10 includes, for example, the color filters illustrated in FIG. 10A or FIG. 10B, as in the imaging system 1A according to the first embodiment. Further, like the imaging system 1A according to the first embodiment, the imaging system 1B according to the second embodiment is usable aboard a mobile body, such as a vehicle.

<Configuration Example of Image Sensor>

A description will be given of a basic configuration of the image sensor 20 in the imaging system 1B according to the second embodiment. Here, as the image sensor 20, a CMOS image sensor, which is a kind of an image sensor of an X-Y address scheme will be described as an example. The CMOS image sensor is an image sensor fabricated by applying or partially using a CMOS process. However, the image sensor 20 is not limited to the CMOS image sensor.

[Configuration Example of CMOS Image Sensor]

Figure 20:
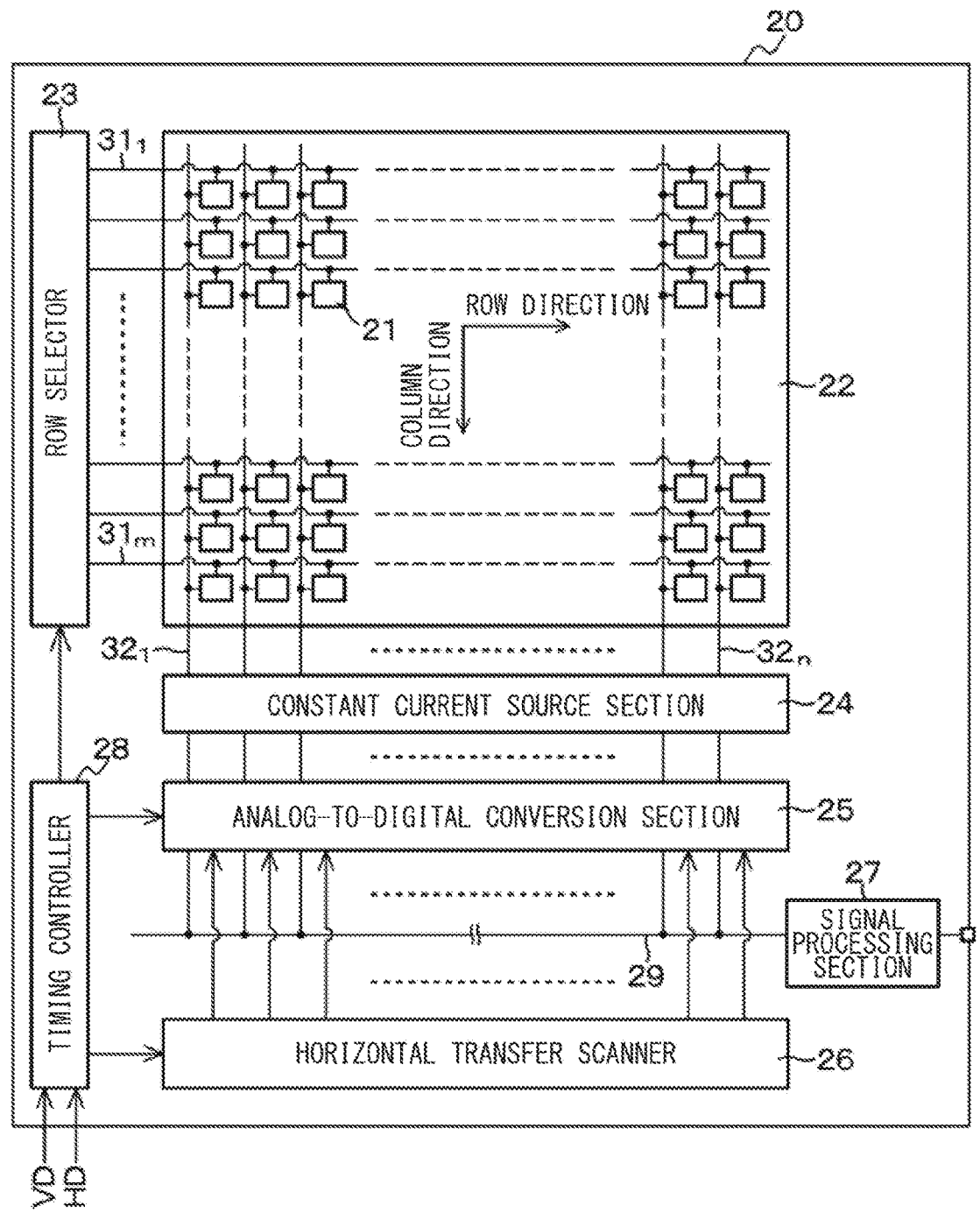
FIG. 20 is a block diagram illustrating an outline of a configuration of a CMOS image sensor that is an example of an image sensor in the imaging system according to the second embodiment.

FIG. 20 is a block diagram illustrating an outline of a configuration of the CMOS image sensor that is an example of the image sensor 20 in the imaging system 1B according to the second embodiment.

The image sensor 20 according to the present example has a configuration including a pixel array section 22 in which pixels 21 including light receiving sections (photoelectric conversion sections) are two-dimensionally arranged in a row direction and a column direction, that is, in a matrix form, and peripheral circuit sections for the pixel array section 22. Here, the row direction refers to a direction of arrangement of the pixels 21 in pixel rows, and the column direction refers to a direction of arrangement of the pixels 21 in pixel columns. The pixel 21 performs photoelectric conversion to generate and accumulate photoelectric charge corresponding to the amount of received light.

The image sensor 20 according to the present example is, for example, an RGB sensor in which the pixels 21 of the pixel array section 22 incorporate filters of respective colors of R (red), G (green), B (blue). However, the image sensor 20 is not limited to the RGB sensor.

The peripheral circuit sections for the pixel array section 22 include, for example, a row selector 23, a constant current source section 24, an analog-to-digital conversion section 25, a horizontal transfer scanner 26, a signal processing section 27, a timing controller 28, etc.

In the pixel array section 22, pixel driving lines $31_1$ to $31_m$ (which may hereinafter be collectively referred to as "pixel driving line(s) 31" in some cases) are wired along the row direction for respective pixel rows in the pixel arrangement in the matrix form. Further, vertical signal lines $32_1$ to $32_n$ (which may hereinafter be collectively referred to as the "vertical signal line(s) 32" in some cases) are wired along the column direction for respective pixel columns. The pixel driving line 31 transmits a driving signal used to perform driving when reading out a signal from the pixel 21. Although the pixel driving line 31 is illustrated as a single wiring line in FIG. 1, the number of the pixel driving lines 31 is not limited to one. Respective one ends of the pixel driving lines 31 are coupled to output ends of the row selector 23 corresponding to the respective rows.

The following will describe each circuit section of the peripheral circuit sections for the pixel array section 22, that is, the row selector 23, the constant current source section 24, the analog-to-digital conversion section 25, the horizontal transfer scanner 26, the signal processing section 27, and the timing controller 28.

The row selector 23 includes a shift register, an address decoder, etc., and controls scanning of the pixel row and an address of the pixel row when selecting each pixel 21 of the pixel array section 22. Although illustration of a specific configuration of the row selector 23 is omitted, the row selector 23 typically has a configuration with two scanning systems including a readout scanning system and a sweeping scanning system.

The readout scanning system selectively scans the pixels 21 of the pixel array section 22 sequentially on a per-row basis to read out pixel signals from the pixels 21. The pixel signal read out from the pixel 21 is an analog signal. The sweeping scanning system performs sweeping scanning on the readout row on which the readout scanning is to be performed by the readout scanning system, in advance of the readout scanning by a time corresponding to a shutter speed.

The sweeping scanning by the sweeping scanning system sweeps out unnecessary electric charge from the light receiving section (photoelectric conversion section) of the pixel 21 in the readout row, thereby resetting the light receiving section. Thus, this sweeping (resetting) of unnecessary electric charge by the sweeping scanning system enables what is called electronic shutter operation to be performed. The electronic shutter operation herein refers to an operation for sweeping out photoelectric charge of the light receiving section and starting new exposure (starting accumulation of photoelectric charge).

The constant current source section 24 includes a plurality of current sources I (see FIG. 18) including, for example, MOS transistors coupled to the respective vertical signal lines $32_1$ to $32_n$ on a per-pixel-column basis, and supplies a bias current through each of the vertical signal lines $32_1$ to $32_n$ to each pixel 21 of the pixel row selectively scanned by the row selector 23.

The analog-to-digital conversion section 25 includes an assembly of a plurality of analog-to-digital converters provided in correspondence with the pixel columns (e.g., provided for respective pixel columns) of the pixel array section 22. The analog-to-digital conversion section 25 is a column-parallel analog-to-digital conversion section that converts the analog pixel signals outputted on a per-pixel-column basis through the respective vertical signal lines $32_1$ to $32_n$ into digital signals.

As the analog-to-digital converters in the column-parallel analog-to-digital conversion section 25, for example, single-slope analog-to-digital converters, which are an example of analog-to-digital converters of a reference signal comparison type, are usable. However, the analog-to-digital converters are not limited to the single-slope analog-to-digital converters, and successive approximation analog-to-digital converters, delta-sigma modulation ($\Delta\Sigma$ modulation) analog-to-digital converters, and the like are usable.

The examples of the analog-to-digital converters in the column-parallel analog-to-digital conversion section 25 also apply to the analog-to-digital converters in the analog-to-digital conversion section included in the column processing section 15 (see FIG. 3) of the event detection sensor 10 described previously.

The horizontal transfer scanner 26 includes a shift register, an address decoder, etc., and controls the scanning of the pixel column and an address of the pixel column when reading out a signal from each pixel 21 of the pixel array section 22. Under the control by the horizontal transfer scanner 26, the pixel signals converted to the digital signals by the analog-to-digital conversion section 25 are read out on a per-pixel-column basis to a horizontal transfer line (horizontal output line) 29.

The signal processing section 27 performs predetermined signal processing on the digital pixel signal supplied through the horizontal transfer line 29, and generates two-dimensional image data. For example, the signal processing section 27 performs corrections of line defects and point defects, or signal clamping, and performs digital signal processing including parallel-to-serial conversion, compression, encoding, adding, averaging, and intermittent sampling action. The signal processing section 27 outputs the generated image data to a downstream device as the output signal of the image sensor 20.

On the basis of a vertical synchronization signal VD and a horizontal synchronization signal HD that are supplied externally, and furthermore, a master clock MCK (not illustrated), etc., the timing controller 28 generates various timing signals, clock signals, control signals, etc. On the basis of these signals generated, the timing controller 28 then performs driving control on the row selector 23, the constant current source section 24, the analog-to-digital conversion section 25, the horizontal transfer scanner 26, the signal processing section 27, etc.

Under the control by the timing controller 28, imaging is performed at the image sensor 20 in synchronization with the synchronization signals such as the vertical synchronization signal VD. That is, the image sensor 20 is a synchronous imaging device that performs imaging at a predetermined frame rate.

[Circuit Configuration Example of Pixel]

Figure 21:
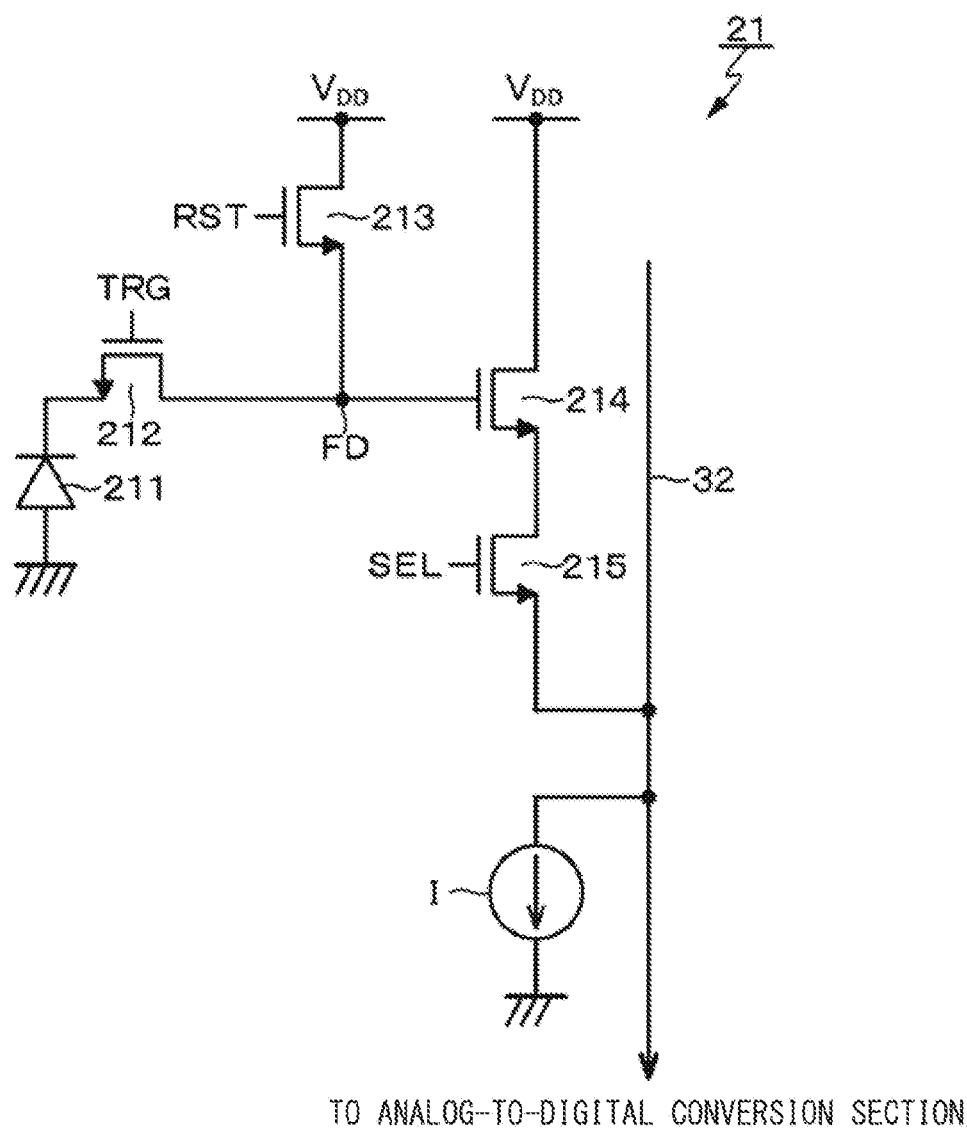
FIG. 21 is a circuit diagram illustrating an example of a circuit configuration of a pixel in the image sensor.

FIG. 21 is a circuit diagram illustrating an example of a circuit configuration of the pixel 21 of the pixel array section 22 in the image sensor 20.

The pixel 21 includes, for example, a photodiode 211 as the light receiving section (photoelectric conversion section). The pixel 21 has a pixel configuration including, in addition to the photodiode 211, a transfer transistor 212, a reset transistor 213, an amplification transistor 214, and a selection transistor 215.

It is to be noted that although N-type MOS transistors, for example, are used here as the four transistors including the transfer transistor 212, the reset transistor 213, the amplification transistor 214, and the selection transistor 215, the combination of electrical conduction types of the four transistors 212 to 215 exemplified here is merely one example, and such a combination is thus non-limiting.

In the pixel 21, a plurality of pixel driving lines serving as the pixel driving lines 31 described above is wired in common to the respective pixels 21 in the same pixel row. These plurality of pixel driving lines is coupled on a per-pixel-row basis to output ends of the row selector 23 corresponding to the respective pixel rows. The row selector 23 outputs the transfer signal TRG, the reset signal RST, and the selection signal SEL appropriately to the plurality of pixel driving lines.

The photodiode 211 has an anode electrode coupled to a low-potential-side power supply (e.g., ground). The photodiode 211 photoelectrically converts received light into photoelectric charge (in this example, photoelectrons) of a charge amount corresponding to the light amount, and accumulates the photoelectric charge. The photodiode 211 has a cathode electrode electrically coupled to a gate electrode of the amplification transistor 214 via the transfer transistor 212. Here, a region where the gate electrode of the amplification transistor 214 is electrically coupled is a floating diffusion (floating diffusion region or impurity diffusion region) FD. The floating diffusion FD is an electric charge-to-voltage conversion section that converts electric charge into a voltage.

The transfer signal TRG that is in an active state at a high level (e.g., a $V_{DD}$ level) is supplied from the row selector 23 to a gate electrode of the transfer transistor 212. The transfer transistor 212 turns on in response to the transfer signal TRG, and thereby transfers the photoelectric charge resulting from photoelectric conversion at the photodiode 211 and accumulated in the photodiode 211 to the floating diffusion FD.

The reset transistor 213 is coupled between the power supply line of the power supply voltage $V_{DD}$ and the floating diffusion FD. The reset signal RST that is in an active state at a high level is supplied from the row selector 23 to a gate electrode of the reset transistor 213. The reset transistor 213 turns on in response to the reset signal RST, and resets the floating diffusion FD by sweeping out electric charge of the floating diffusion FD to a node of the voltage $V_{DD}$.

The amplification transistor 214 has the gate electrode coupled to the floating diffusion FD and a drain electrode coupled to the power supply line of the power supply voltage $V_{DD}$. The amplification transistor 214 serves as an input section of a source follower that reads out a signal obtained by photoelectric conversion at the photodiode 211. The amplification transistor 214 has a source electrode coupled to the vertical signal line 32 via the selection transistor 215. In addition, the amplification transistor 214 and the current source I coupled to one end of the vertical signal line 32 constitute a source follower that converts the voltage of the floating diffusion FD into a potential of the vertical signal line 32.

The selection transistor 215 has a drain electrode coupled to the source electrode of the amplification transistor 214, and a source electrode coupled to the vertical signal line 32. The selection signal SEL that is in an active state at a high level is supplied from the row selector 23 to a gate electrode of the selection transistor 215. The selection transistor 215 turns on in response to the selection signal SEL, and thereby brings the pixel 21 into a selected state to allow the signal outputted from the amplification transistor 214 to be transferred to the vertical signal line 32.

It is to be noted that although a 4-Tr configuration including the transfer transistor 212, the reset transistor 213, the amplification transistor 214, and the selection transistor 215, that is, including four transistors (Trs), is described here as an example of the pixel circuit of the pixel 21, this is non-limiting. For example, the selection transistor 215 may be omitted to employ a 3-Tr configuration in which the amplification transistor 214 has the function of the selection transistor 215, or a configuration of 5-Tr or more including a larger number of transistors may be employed on an as-needed basis.

[Configuration Example of Chip Structure]

Examples of the chip (semiconductor integrated circuit) structure of the image sensor 20 having the above-described configuration include a flat-type chip structure and a stacked-type chip structure. The image sensor 20 of either of the flat-type chip structure and the stacked-type chip structure can take a front-illuminated pixel structure that captures illumination light from a front surface side or a back-illuminated pixel structure that captures illumination light from a back surface side opposite to the front surface side, where a substrate surface on the side on which a wiring layer is provided serves as the front surface (front) for the pixel 21. The flat-type chip structure and the stacked-type chip structure will be described below.

(Flat-Type Chip Structure)

Figure 22:
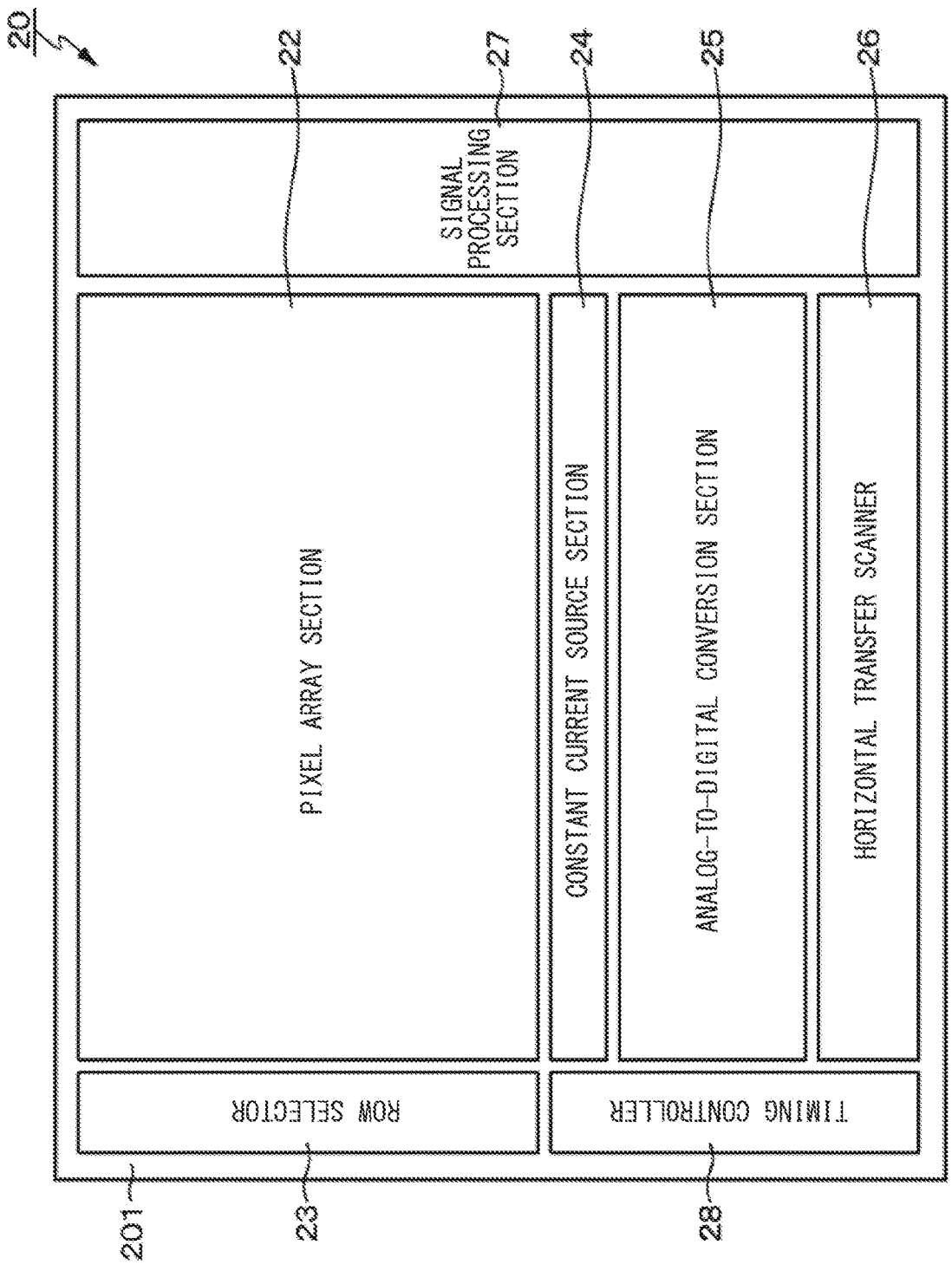
FIG. 22 is a plan diagram illustrating an outline of a flat-type chip structure of the image sensor.

FIG. 22 is a plan diagram illustrating an outline of the flat-type chip structure of the image sensor 20.

As illustrated in FIG. 22, the flat-type chip structure (so-called flat structure) is a structure in which circuit portions peripheral to the pixel array section 22 are formed on a semiconductor substrate 201 identical with that of the pixel array section 22 including the pixels 21 arranged in a matrix form. Specifically, the row selector 23, the constant current source section 24, the analog-to-digital conversion section 25, the horizontal transfer scanner 26, the signal processing section 27, the timing controller 28, etc. are formed on the same semiconductor substrate 201 as that of the pixel array section 22.

(Stacked-Type Chip Structure)

Figure 23:
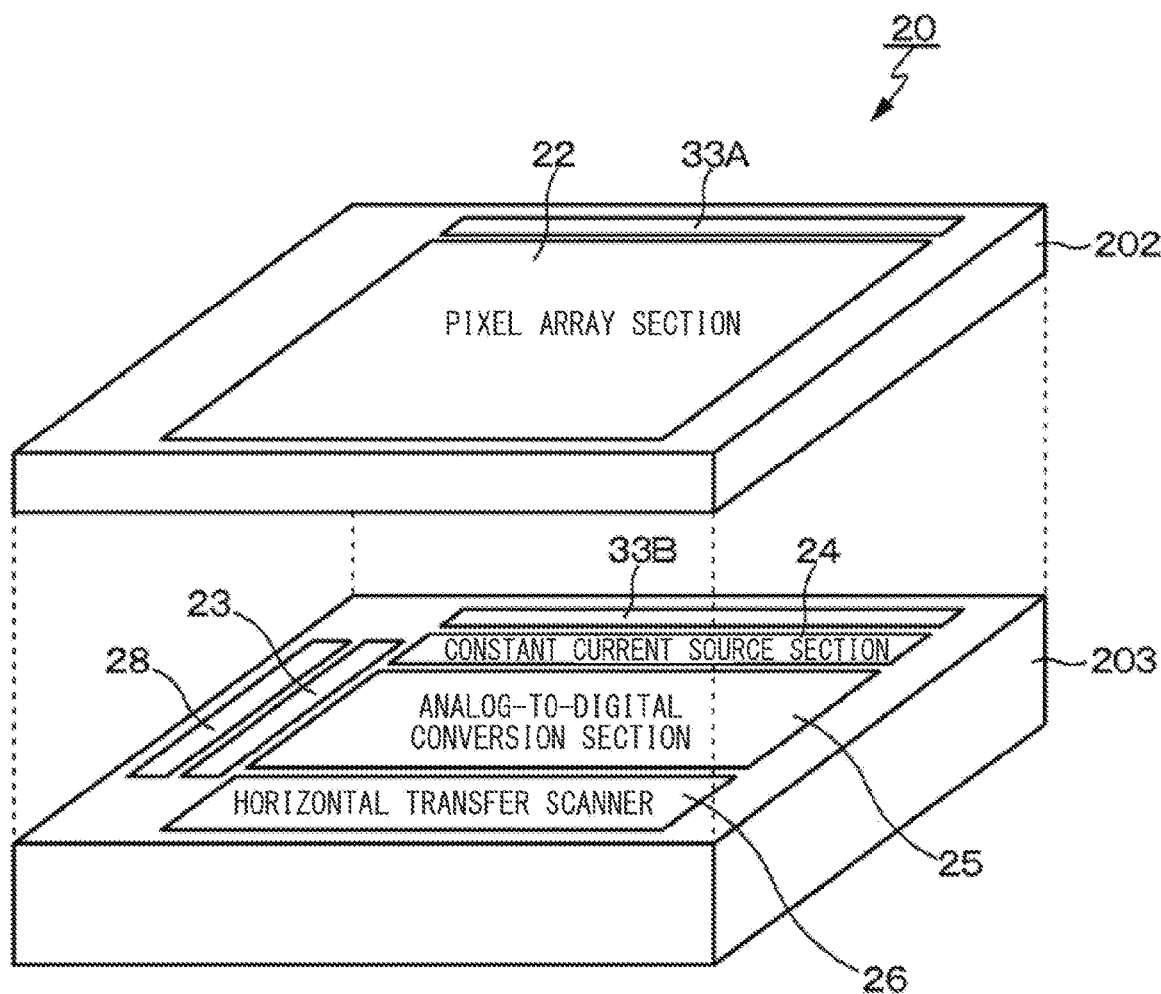
FIG. 23 is a plan diagram illustrating an outline of a stacked-type chip structure of the image sensor.

FIG. 23 is an exploded perspective diagram illustrating an outline of the stacked-type chip structure of the image sensor 20.

As illustrated in FIG. 23, the stacked-type chip structure (so-called stacked structure) is a structure in which at least two semiconductor substrates including a first semiconductor substrate 202 and a second semiconductor substrate 203 are stacked on each other. In the stacked structure, the pixel array section 22 is formed on the first semiconductor substrate 202 serving as the first layer. Further, the circuit portions including the row selector 23, the constant current source section 24, the analog-to-digital conversion section 25, the horizontal transfer scanner 26, the signal processing section 27, the timing controller 28, etc. are formed on the second semiconductor substrate 203 serving as the second layer. In addition, the first semiconductor substrate 202 as the first layer and the second semiconductor substrate 203 as the second layer are electrically coupled to each other through connection parts 33A and 33B such as vias (VIAs) or Cu—Cu junctions.

The use of the image sensor 20 having the stacked structure makes it possible to apply a process suitable for fabrication of the pixels 21 to the semiconductor substrate 202 as the first layer, and to apply a process suitable for fabrication of the circuit portions to the semiconductor substrate 203 as the second layer. This makes it possible to achieve process optimization in manufacturing the image sensor 20. In fabricating the circuit portions, in particular, application of leading processes becomes possible.

It is to be noted that although a two-layer stacked structure in which the first semiconductor substrate 202 and the second semiconductor substrate 203 are stacked on each other is described here as an example, the stacked structure is not limited to the two-layer structure, and a structure including three or more layers is employable. In addition, in the case of a stacked structure with three or more layers, the circuit portions including the row selector 23, the constant current source section 24, the analog-to-digital conversion section 25, the horizontal transfer scanner 26, the signal processing section 27, etc. can be formed in a manner in which these circuit portions are distributed among the second and subsequent semiconductor substrates.

In the imaging system 1B according to the second embodiment having the above-described configuration, the event detection sensor 10 and the image sensor 20 perform an event detection operation and an imaging operation, respectively, under the control by the controller 50. The event signal (event data) outputted from the event detection sensor 10 and image data outputted from the image sensor 20 are supplied to the motion recognizer 30.

The motion recognizer 30 recognizes (detects) motion of an object on the basis of the event signal outputted from the event detection sensor 10. More specifically, the motion recognizer 30 generates event frames by framing the event signal outputted from the event detection sensor 10, and performs motion detection among the event frames. In a case of performing object recognition of an event using the event signal outputted from the event detection sensor 10, the object recognizer 40 is to perform object recognition on the basis of the result of motion detection supplied from the motion recognizer 30.

The image sensor 20 includes a synchronous imaging device, and performs imaging at a predetermined frame rate, e.g., a fixed frame rate. Therefore, it is not necessary to generate event frames as in the case of the event detection sensor 10. The image data outputted from the image sensor 20 on a per-frame basis is thus directly supplied to the object recognizer 40. The object recognizer 40 then performs object recognition on the basis of the image data in frames.

Incidentally, because the event detection sensor 10 including the asynchronous imaging device has a pixel configuration with the event detector 63, the pixel size is inevitably larger than that of the image sensor 20 including the synchronous imaging device. Therefore, the event detection sensor 10 is lower in resolution than the image sensor 20 that performs imaging at a fixed frame rate. In contrast, the image sensor 20 including the synchronous imaging device is superior to the asynchronous imaging device in resolution.

In the following, a description is given of specific examples in which in the imaging system 1B according to the second embodiment, the event detection sensor 10 provided with color filters and the image sensor 20 are used in combination to detect an event in a specific wavelength band, and predetermined signal processing is performed on the basis of the detection result. It is to be noted that processes in each of Examples described below are basically executed under the control by the controller 50 in the imaging system 1A illustrated in FIG. 1.

Example 8

Figure 24:
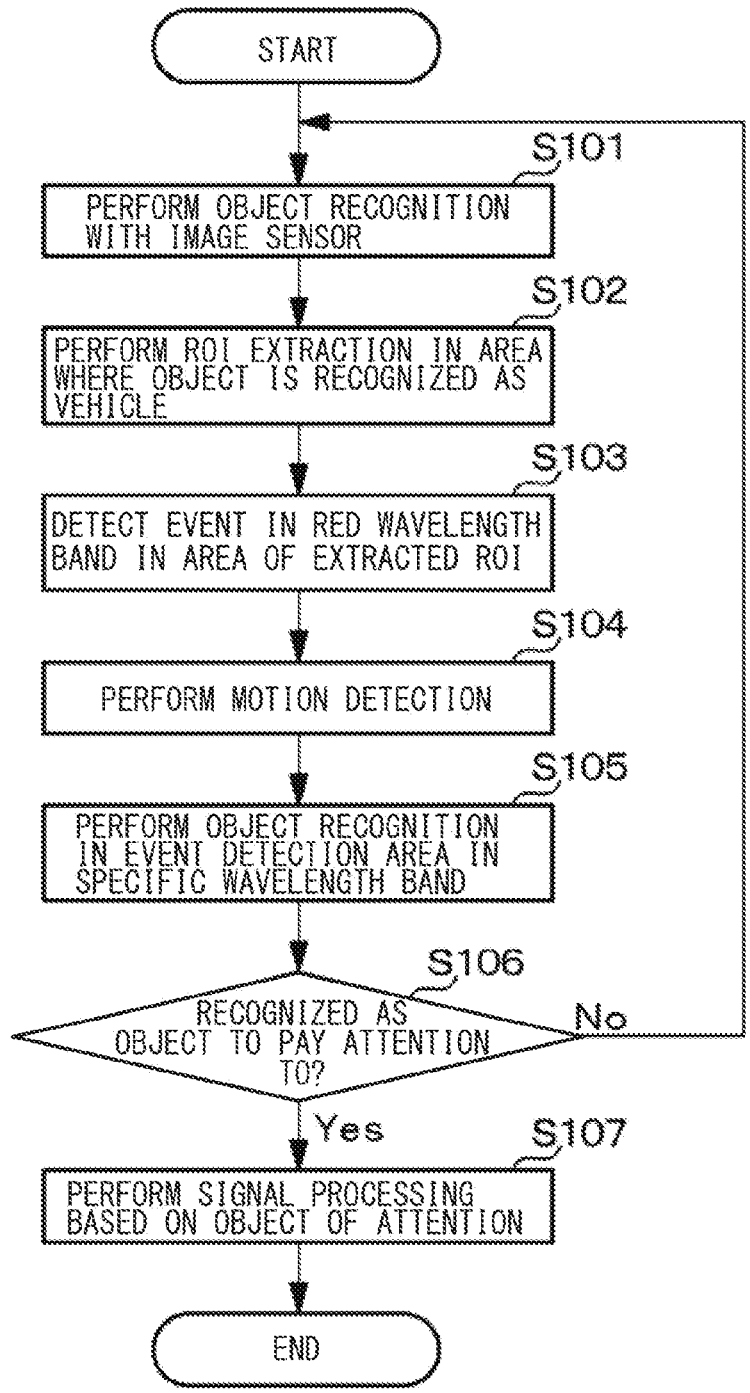
FIG. 24 is a flowchart illustrating a flow of processes of a most generic concept according to Example 8.

Example 8 is an example of processes of a most generic concept of the second embodiment. A flow of the processes of the most generic concept according to Example 8 is illustrated in a flowchart of FIG. 24.

During traveling of a vehicle equipped with the imaging system 1B according to the second embodiment, the controller 50 first performs, at the object recognizer 40 illustrated in FIG. 19, object recognition using the image data of the image sensor 20, with the front as a region of attention (step S101). As described above, the image sensor 20 is superior in resolution to the event detection sensor 10. Therefore, performing object recognition on the basis of the output of the image sensor 20 makes it possible to increase the accuracy of recognition as compared with a case of performing object recognition on the basis of the output of the event detection sensor 10.

However, because the image sensor 20 performs imaging at a predetermined frame rate, the event detection sensor 10 is superior to the image sensor 20 in terms of power consumption. Therefore, the processes in and subsequent to step S102 are performed using the event detection sensor 10. The same applies to examples to be described later.

Next, the controller 50 performs, in the area where object recognition has been performed as the area of attention, extraction of the ROI (step S102) on the basis of the output of the event detection sensor 10, subsequently detects an event in an area of the extracted ROI (step S103), and subsequently performs motion detection on the object detected as an event (step S104).

Next, the controller 50 performs object recognition in an event detection area in a specific wavelength band (step S105), and subsequently determines whether or not the object is recognized as an object to pay attention to (step S106). In a case where the object is not recognized as an object to pay attention to (No in S106), the controller 50 returns to step S101. In a case where the object is recognized as an object to pay attention to (Yes in S106), the controller 50 executes predetermined signal processing based on the object to pay attention to (step S107), and ends the series of processes of the most generic concept according to Example 8.

As described above, according to Example 8, it is possible to perform object recognition in an area of attention by using the image data of the image sensor 20 that is superior in resolution to the event detection sensor 10. In addition, event detection is performed in a specific wavelength band, motion detection is performed on the object detected as an event, and in a case where the object is recognized as an object to pay attention to, predetermined signal processing based on that object is performed. It is thereby possible to detect and determine pieces of information in various wavelength bands, including lighting (blinking) of a brake light or taillight of a vehicle traveling in front of an own vehicle, blinking of a direction indicator, a change in color of a traffic light, an electronic sign, etc. in the same manner as the driver does.

Here, the "predetermined signal processing" refers to a process of transmitting a command signal for various kinds of automatic control, etc. to, for example, the driving system control unit 12010 of the vehicle control system 12000 illustrated in FIG. 29, for example. Upon receiving the command signal from the event detection sensor 10, the vehicle control system 12000 automatically performs various kinds of control, such as applying brakes by automatic control or calling the driver's attention by displaying an alert.

Example 9

Figure 25:
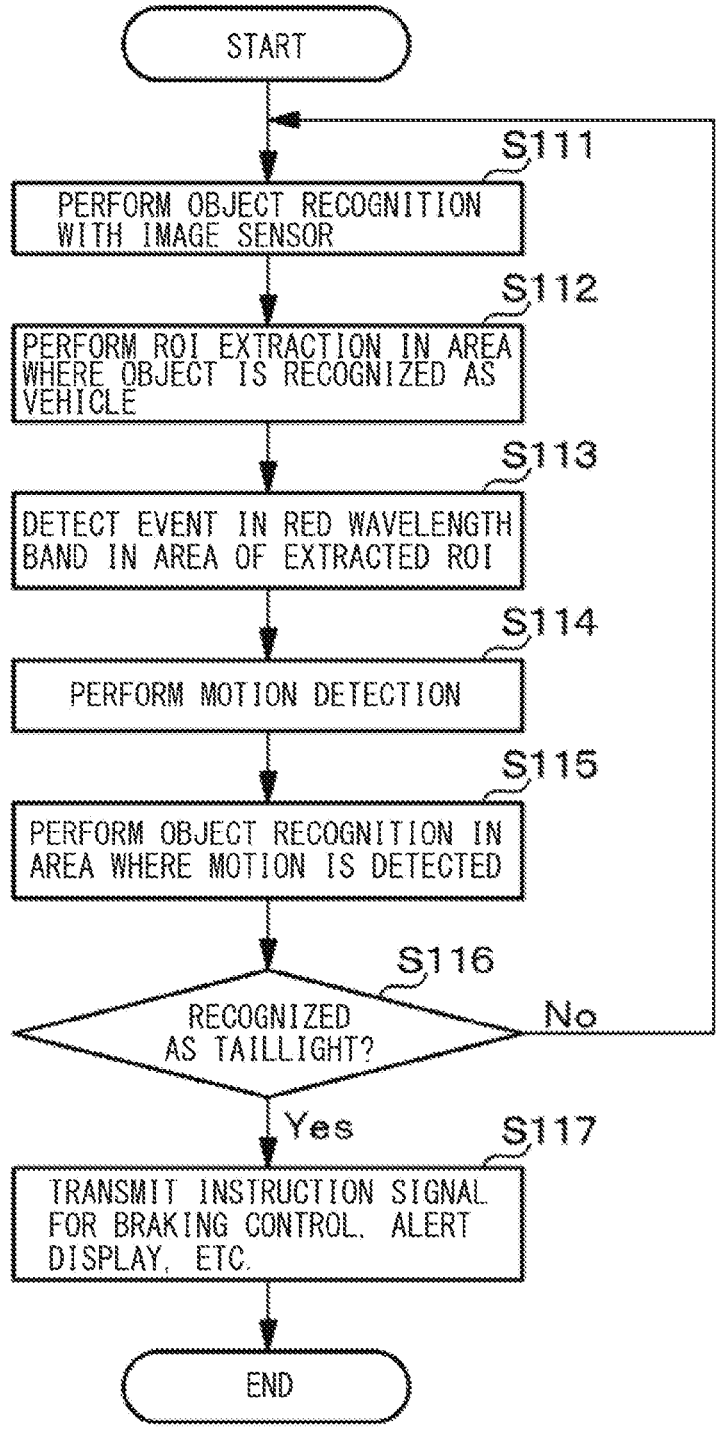
FIG. 25 is a flowchart illustrating a flow of processes for recognition of a vehicle and sensing of a taillight according to Example 9.

Example 9 is an example of sensing a taillight of a vehicle traveling in front of an own vehicle after recognizing the vehicle traveling in front of the own vehicle. A flow of processes for vehicle recognition and taillight sensing according to Example 9 is illustrated in a flowchart of FIG. 25. In Example 9, for example, the RCCC filter illustrated in FIG. 10A is used as the color filter to be provided for each pixel 11 in the event detection sensor 10. In the case of the RCCC filter, red (R) serves as the specific wavelength band. The same applies to examples to be described later.

During traveling of the vehicle equipped with the imaging system 1B according to the second embodiment, the controller 50 first recognizes, at the object recognizer 40 illustrated in FIG. 19, an object as a vehicle in front by using the image data of the image sensor 20 (step S111). Subsequently, the controller 50 performs extraction of the ROI in an area where the object is recognized as the vehicle (step S112), and subsequently performs event detection in the red wavelength band in an area of the extracted ROI (step S113).

Next, the controller 50 performs motion detection on the object detected as an event (step S114), subsequently performs object recognition in an area where motion is detected (step S115), and subsequently determines whether or not the object is recognized as an object to pay attention to, that is, recognized as a taillight (step S116).

Then, in a case where the object is not recognized as a taillight (No in S116), the controller 50 returns to step S111. In a case where the object is recognized as a taillight (Yes in S116), the controller 50 transmits an instruction signal for braking control, alert display, or the like to the driving system control unit 12010 of the vehicle control system 12000 illustrated in FIG. 29 via the interface 80 (step S117). Then, the series of processes for vehicle recognition and taillight sensing according to Example 9 is ended.

Upon receiving the instruction signal for braking control, alert display, or the like from the imaging system 1B according to the second embodiment, the driving system control unit 12010 of the vehicle control system 12000 performs control such as applying brakes by automatic control or calling the driver's attention by displaying an alert.

As described above, in Example 9, object recognition is performed using image data of the image sensor 20 that is superior in resolution to the event detection sensor 10, and thereafter, event detection in the red wavelength band and motion detection on the object detected as an event are performed. Then, in the case where the object is recognized as the taillight of the vehicle traveling in front of the own vehicle, it is determined that the inter-vehicle distance between the own vehicle and the other vehicle traveling in front of the own vehicle is close enough to be able to recognize the taillight of the other vehicle, and the instruction signal for braking control, alert display, or the like is transmitted to the driving system control unit 12010 of the vehicle control system 12000. The vehicle control system 12000 is thereby able to perform control such as applying brakes by automatic control or calling the driver's attention by displaying an alert, thus being able to contribute to safe traveling.

It is to be noted that in Example 9, the object is recognized as a taillight by object recognition at the time of the recognition process on the taillight; however, flicker of the taillight may be detected and used as information in object recognition (object sensing).

Example 10

Figure 26:
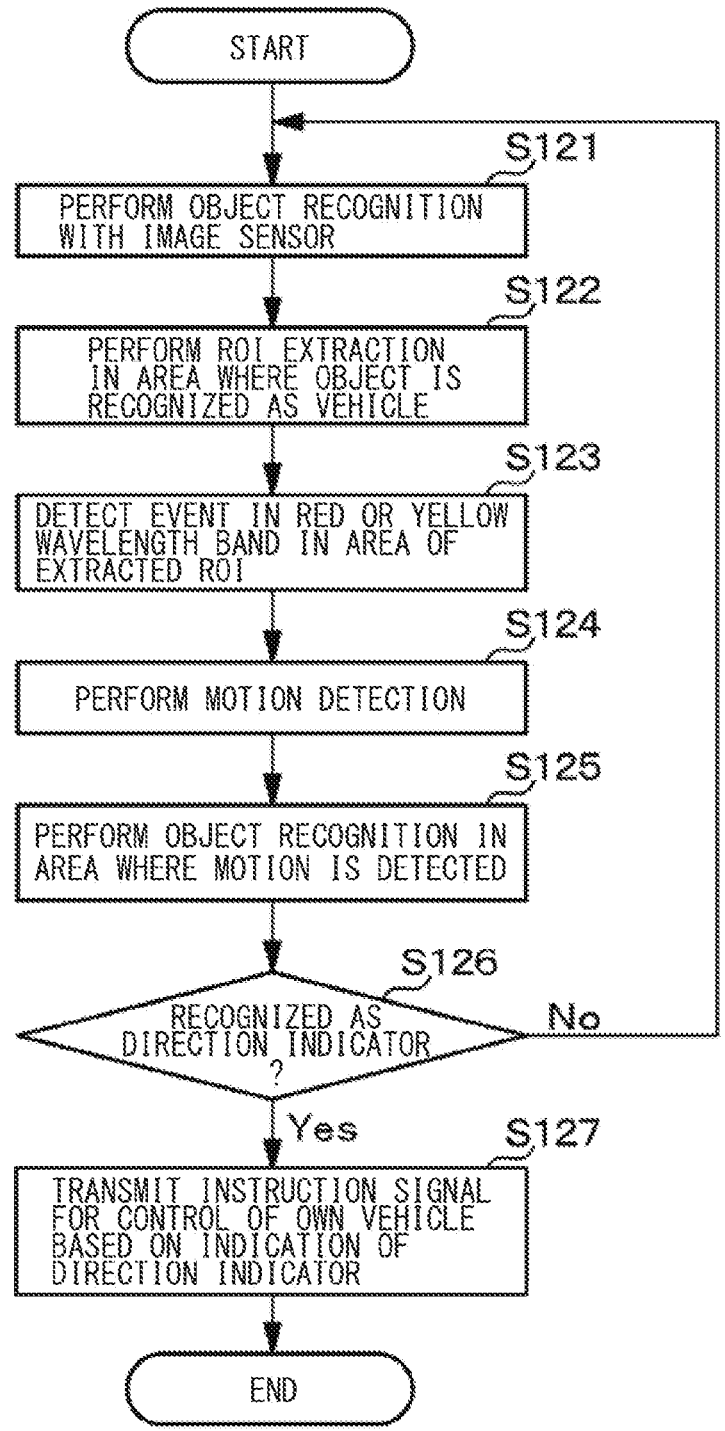
FIG. 26 is a flowchart illustrating a flow of processes for recognition of a vehicle and sensing of a direction indicator according to Example 10.

Example 10 is an example of sensing a direction indicator (blinker) after recognizing a vehicle traveling in front of an own vehicle. A flow of processes for vehicle recognition and direction-indicator sensing according to Example 10 is illustrated in a flowchart of FIG. 26.

During traveling of the vehicle equipped with the imaging system 1B according to the second embodiment, the controller 50 first recognizes an object as a vehicle in front by using image data of the image sensor 20 (step S121). Subsequently, the controller 50 performs extraction of the ROI in an area where the object is recognized as a vehicle (step S122), and subsequently detects an event in the red wavelength band in an area of the extracted ROI (step S123).

Next, the controller 50 performs motion detection on the object detected as an event (step S124), subsequently performs object recognition in an area where motion is detected (step S125), and subsequently determines whether or not the object is recognized as an object to pay attention to, that is, recognized as a direction indicator (blinker) (step S126). In a case where the object is not recognized as a direction indicator (No in S126), the controller 50 returns to step S121.

Further, in a case where the object is recognized as a direction indicator (Yes in S126), the controller 50 transmits an instruction signal for performing controlling of the own vehicle based on the content of indication of the direction indicator to the driving system control unit 12010 of the vehicle control system 12000 illustrated in FIG. 29 via the interface 80 (step S127). Then, the series of processes for vehicle recognition and direction-indicator sensing according to Example 10 is ended.

As described above, in Example 10, object recognition is performed using image data of the image sensor 20 that is superior in resolution to the event detection sensor 10, and thereafter, event detection in the red wavelength band and motion detection on the object detected as an event are performed. Then, after recognition of the vehicle traveling in front of the own vehicle, a recognition process is performed on a direction indicator in an area where the vehicle has been recognized, and the instruction signal for performing controlling of the own vehicle based on the content of indication of the direction indicator (right turn, left turn, or hazard) is transmitted to the driving system control unit 12010 of the vehicle control system 12000.

Here, for example, when the vehicle in front provides a direction indication of a right turn, it follows that the vehicle traveling in front of the own vehicle will become no longer present in front because of the right turn. Accordingly, controlling the driving system control unit 12010 of the vehicle control system 12000 to increase the vehicle speed is conceivable as the "controlling of the own vehicle based on the content of indication of the direction indicator". Alternatively, when the direction indicator of the vehicle in front indicates a hazard (flashing display), there is a high possibility that the vehicle traveling in front will stop. Accordingly, controlling the driving system control unit 12010 of the vehicle control system 12000 to automatically apply breaks is conceivable, for example.

It is to be noted that in Example 10, the object is recognized as a direction indicator by object recognition at the time of the recognition process on the direction indicator; however, flicker of the direction indicator may be detected and used as information in object recognition (object sensing).

Example 11

Example 11 is an example of recognizing a traffic light and sensing a red light. A flow of processes for traffic-light recognition and red-light sensing according to Example 11 is illustrated in a flowchart of FIG. 27.

During traveling of the vehicle equipped with the imaging system 1B according to the second embodiment, the controller 50 first performs object recognition by using image data of the image sensor 20 (step S131), and subsequently detects a traffic light as an object to be recognized (step S132).

Next, the controller 50 performs extraction of the ROI in an area where the traffic light is detected (step S133), subsequently detects an event in the red wavelength band in an area of the extracted ROI (step S134), and subsequently performs motion detection on the object detected as an event (step S135).

Next, the controller 50 performs object recognition in an area where motion is detected (step S136), and subsequently determines whether or not the object is recognized as an object to pay attention to, that is, recognized as a red light of the traffic light (step S137). In a case where the object is not recognized as a red light (No in S137), the controller 50 returns to step S131.

Further, in a case where the object is recognized as a red light (Yes in S137), the controller 50 transmits an instruction signal for braking control, alert display, or the like to the driving system control unit 12010 of the vehicle control system 12000 illustrated in FIG. 29 via the interface 80 (step S138). Then, the series of processes for traffic-light recognition and red-light sensing according to Example 11 is ended.

As described above, in Example 11, object recognition is performed using image data of the image sensor 20 that is superior in resolution to the event detection sensor 10, and thereafter, in a case where the object is a traffic light and the content of indication thereof is a red light, the instruction signal for braking control, alert display, or the like is transmitted to the driving system control unit 12010 of the vehicle control system 12000. The vehicle control system 12000 is thereby able to perform control such as applying brakes by automatic control or calling the driver's attention by displaying an alert, thus being able to contribute to safe traveling.

It is to be noted that in Example 11, the object is recognized as a traffic light by object recognition at the time of the recognition process on the traffic light; however, flicker information (e.g., frequency, duty ratio, etc.) of the traffic light may be detected and used as information in object recognition (object sensing).

Example 12

Figure 28:
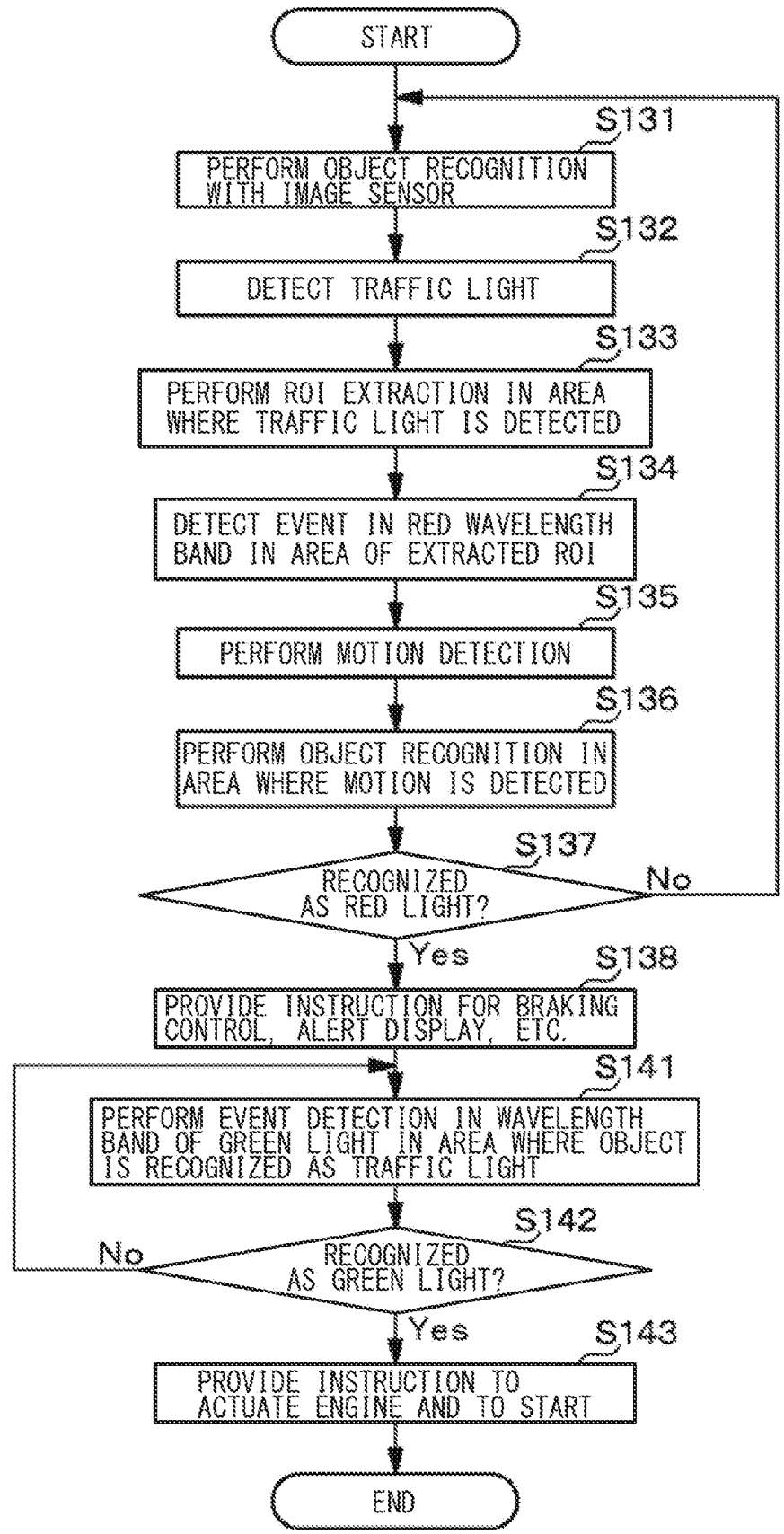
FIG. 28 is a flowchart illustrating a flow of processes for recognition of a traffic light and sensing of a change from a red light to a green light according to Example 12.

Example 12 is a modification example of Example 11, and is an example of sensing a change in the traffic light from a red light to a green light. A flow of processes for traffic-signal recognition and sensing of the change from the red light to the green light according to Example 12 is illustrated in a flowchart of FIG. 28.

Figure 27:
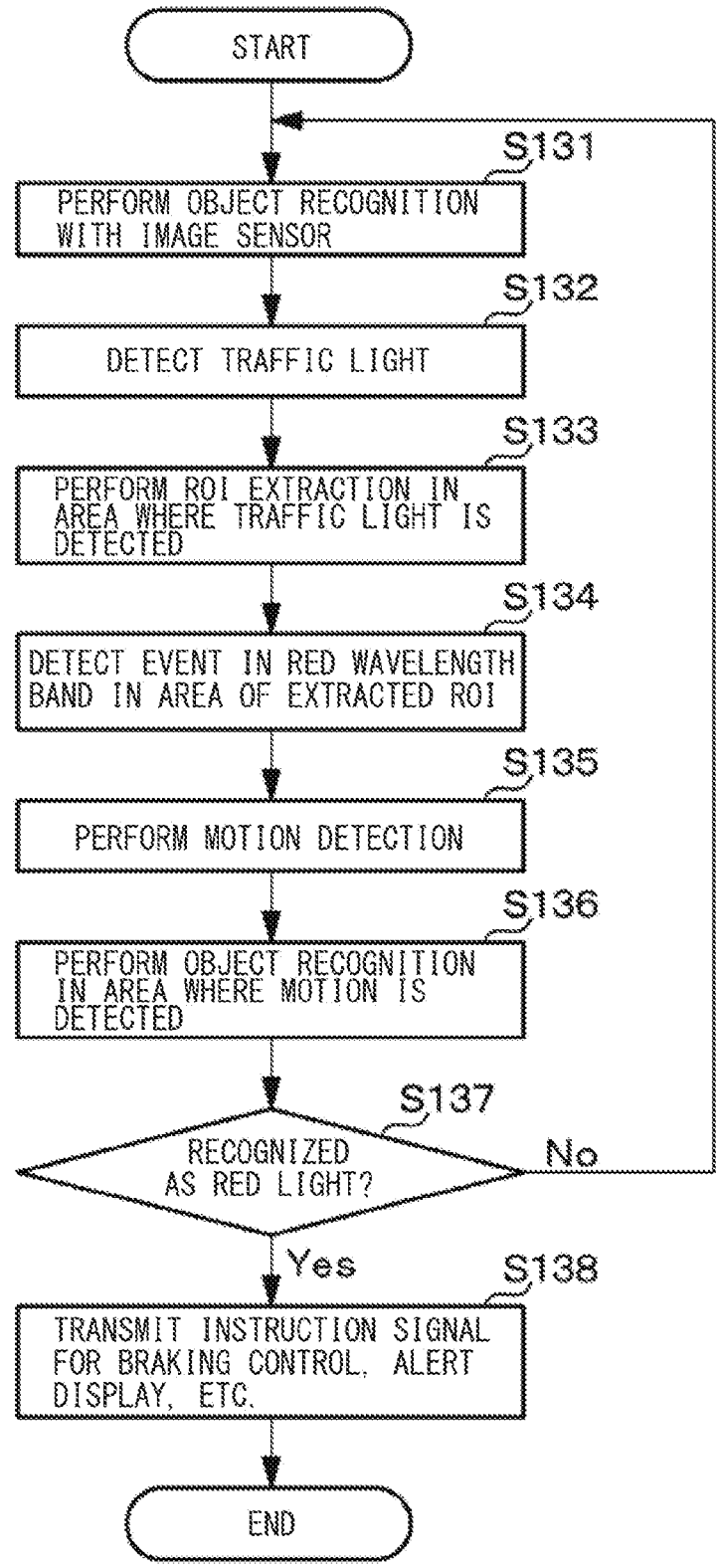
FIG. 27 is a flowchart illustrating a flow of processes for recognition of a traffic light and sensing of a red light according to Example 11.

Example 12 includes the processes in the flowchart of Example 11 illustrated in FIG. 27, with step S141 to step S143 introduced thereinto as processes after step S138. Upon recognition as a red light and transmission of the instruction signal for braking control, alert display, or the like (step S138), event detection is performed in the wavelength band of a green light in the area where the object is recognized as a traffic light (step S141), and subsequently, whether or not the traffic light is recognized as a green light is determined (step S142).

In a case where the traffic light is not recognized as a green light (No in S142), the controller 50 returns to step S131, and in a case where the traffic light is recognized as a green light (Yes in S142), the controller 50 transmits an instruction signal for instructing to actuate engine, to start, etc. to the driving system control unit 12010 of the vehicle control system 12000 via the interface 80 (step S73). Then, the series of processes for traffic-signal recognition and sensing of the change from the red light to the green light according to Example 12 is ended.

As described above, in Example 12, in a situation where the vehicle is in a halt state at a red light and upon a change of the traffic light from the red light to the green light, the instruction signal for instructing to actuate engine, to start, etc. is transmitted to the driving system control unit 12010 of the vehicle control system 12000. The vehicle control system 12000 is thereby able to perform control to automatically actuate engine and start the vehicle, thus making it possible to prevent the occurrence of problems such as delayed start due to overlooking of the traffic light.

It is to be noted that when recognizing as a change of the traffic light from the red light to the green light, the threshold for blue or green may be set to a low value in the area where the object is recognized as a traffic light and to a high value in other areas to thereby allow only the green light to be detectable.

Modification Example

The technology according to the present disclosure has been described above on the basis of preferred embodiments; however, the technology according to the present disclosure is not limited to the embodiments. The configurations and structures of the imaging systems described in the foregoing embodiments are illustrative and are modifiable.

Application Example of Technology According to Present Disclosure

The technology according to the present disclosure is applicable to various products. The following will describe a more specific application example. For example, the technology according to the present disclosure may be implemented as an imaging device or an imaging system to be installed aboard any type of mobile body such as an automobile, an electric vehicle, a hybrid electric vehicle, a motorcycle, a bicycle, a personal mobility, an airplane, a drone, a vessel, a robot, a construction machine, an agricultural machine (tractor), etc.

<Mobile Body>

The technology according to the present disclosure (the present technology) is applicable to various products. For example, the technology according to the present disclosure may be implemented as an imaging device to be installed aboard any type of mobile body such as an automobile, an electric vehicle, a hybrid electric vehicle, a motorcycle, a bicycle, a personal mobility, an airplane, a drone, a vessel, a robot, a construction machine, an agricultural machine (tractor), etc.

FIG. 29 is a block diagram depicting an example of schematic configuration of a vehicle control system as an example of a mobile body control system to which the technology according to an embodiment of the present disclosure can be applied.

The vehicle control system 12000 includes a plurality of electronic control units connected to each other via a communication network 12001. In the example depicted in FIG. 1021, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for autonomous driving, which makes the vehicle to travel autonomously without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 29, an audio speaker 12061, a display section 12062, and an instrument panel 12063 are illustrated as the output device. The display section 12062 may, for example, include at least one of an aboard display and a head-up display.

Figure 30:
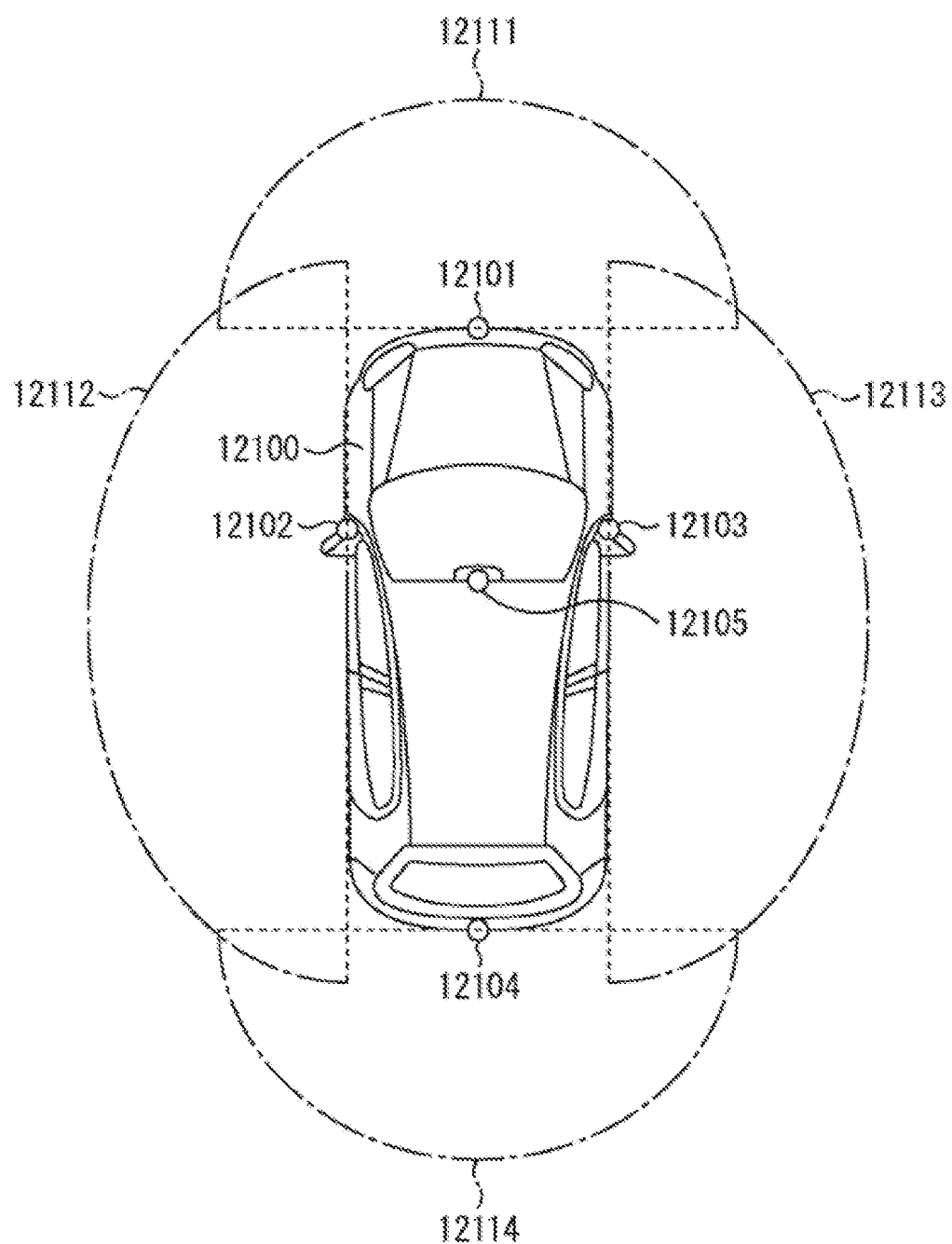
FIG. 30 is a diagram illustrating an example of an installation position for an imaging device in the mobile body control system.

FIG. 30 is a diagram depicting an example of the installation position of the imaging section 12031.

In FIG. 30, a vehicle 12100 includes, as the imaging section 12031, imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The images of the front obtained by the imaging sections 12101 and 12105 are used mainly to detect a preceding vehicle, a pedestrian, an obstacle, a signal, a traffic sign, a lane, or the like.

Incidentally, FIG. 30 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for autonomous driving that makes the vehicle travel autonomously without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

A description has been given above of an example of the vehicle control system 12000 to which the technology according to the present disclosure is applicable. The technology according to the present disclosure is applicable to, for example, the imaging section 12031 or the like among the configurations described above. That is, the imaging system 1A of the first embodiment or the imaging system 1B according to the second embodiment of the present disclosure is usable as the imaging section 12031 or the like in the vehicle control system 12000 having the above-described configuration. Applying the technology according to the present disclosure to the imaging section 12031 or the like makes it possible to perform event detection for each color in a corresponding wavelength band, and accordingly, makes it possible to detect (sense) lighting (blinking) of a brake light or taillight of a vehicle, blinking of a direction indicator, a change in color of a traffic light, an electronic sign, etc. It is thus possible to feed the detection results into autonomous driving or the like and to thereby contribute to achieving safe traveling of vehicles.

<Possible Configurations of Present Disclosure>

It is to be noted that the present disclosure may have the following configurations.

<<A. Imaging System>>

[A-1] An imaging system including:
an event detection sensor that detects an event; and
a controller that controls event detection at the event detection sensor, wherein
the event detection sensor is provided with a color filter on a per-pixel basis, and
the controller controls the event detection in a specific wavelength band based on the color filter.

[A-2] The imaging system according to [A-1], in which the event detection sensor includes an asynchronous imaging device that detects, as the event, that a change in luminance of a pixel that photoelectrically converts entering light exceeds a predetermined threshold.

[A-3] The imaging system according to [A-2], being configured for use aboard a mobile body.

[A-4] The imaging system according to [A-3], in which, upon recognizing an object of attention on the basis of the event detection by the event detection sensor, the controller performs signal processing based on the object of attention.

[A-5] The imaging system according to [A-4], in which the controller transmits a predetermined instruction signal to a control system of the mobile body upon recognizing, as the object of attention, a taillight of a vehicle traveling in front of an own vehicle.

[A-6] The imaging system according to [A-5], in which the controller recognizes the taillight of the vehicle traveling in front of the own vehicle as the object of attention after recognizing the vehicle traveling in front of the own vehicle.

[A-7] The imaging system according to [A-6], in which, upon recognizing the taillight as the object of attention, the controller transmits the predetermined instruction signal to the control system of the mobile body in a case where a relative speed of the own vehicle and the vehicle traveling in front is at or above a predetermined threshold.

[A-8] The imaging system according to [A-4], in which, after recognizing a vehicle traveling in front of an own vehicle, the controller transmits a predetermined instruction signal to a control system of the mobile body upon recognizing, as the object of attention, a direction indicator of the vehicle traveling in front of the own vehicle.

[A-9] The imaging system according to [A-4], in which the controller transmits a predetermined instruction signal to a control system of the mobile body upon recognizing a traffic light as the object of attention and sensing a red light.

[A-10] The imaging system according to [A-9], in which the controller transmits the predetermined instruction signal to the control system of the mobile body upon sensing that the traffic light in a state of the red light has changed from the red light to a green light.

[A-11] The imaging system according to any one of [A-1] to [A-3], including an image sensor that performs imaging at a predetermined frame rate.

[A-12] The imaging system according to [A-11], in which, after performing object recognition on the basis of image data of the image sensor, the controller performs signal processing based on an object of attention upon recognizing the object of attention on the basis of the event detection by the event detection sensor.

[A-13] The imaging system according to claim 12, in which, after recognizing a vehicle traveling in front of an own vehicle, the controller transmits a predetermined instruction signal to a control system of a mobile body upon recognizing, as the object of attention, a taillight of the vehicle traveling in front of the own vehicle.

[A-14] The imaging system according to [A-12], in which, after recognizing a vehicle traveling in front of an own vehicle, the controller transmits a predetermined instruction signal to a control system of a mobile body upon recognizing, as the object of attention, a direction indicator of the vehicle traveling in front of the own vehicle.

[A-15] The imaging system according to [A-12], in which the controller transmits a predetermined instruction signal to a control system of a mobile body upon recognizing a traffic light as the object of attention and sensing a red light.

[A-16] The imaging system according to [A-15], in which the controller transmits the predetermined instruction signal to the control system of the mobile body upon sensing that the traffic light in a state of the red light has changed from the red light to a green light.

REFERENCE SIGNS LIST 1A imaging system according to first embodiment
1B imaging system according to second embodiment
10 event detection sensor
11 pixel
12 pixel array section
13 driving section
14 arbiter section (arbitration section)
15 column processing section
16 signal processing section
20 image sensor
21 pixel
22 pixel array section
23 row selector
24 constant current source section
25 analog-to-digital conversion section
26 horizontal transfer scanner
27 signal processing section
28 timing controller
30 motion recognizer
40 object recognizer
50 controller
60 operation pattern defining section
70 image recording section
80 interface

The invention claimed is:

1. An imaging system, comprising:
an event detection sensor that includes:
a plurality of pixels; and
a plurality of color filters, wherein
each color filter of the plurality of color filters is on a respective pixel of the plurality of pixels,
the event detection sensor is configured to:
detect an event; and
output event data based on the detection of the event,
the event data includes position information and time information,
the position information indicates a position of a first pixel of the plurality of pixels,
the first pixel is associated with the event, and
the time information indicates a time of occurrence of the event; and
a controller configured to control
the detection of the event in a specific wavelength band based on the event data and a first color filter of the plurality of color filters corresponding to the first pixel.

2. The imaging system according to claim 1, wherein
the event detection sensor further includes an asynchronous imaging device, and
the asynchronous imaging device is configured to detect, as the event, a change in luminance of the first pixel that exceeds a first threshold.

3. The imaging system according to claim 2, wherein the imaging system is usable aboard a mobile body.

4. The imaging system according to claim 3, wherein the controller is further configured to:
recognize an object of attention based on the detection of the event; and
execute signal processing based on the object of attention.

5. The imaging system according to claim 4, wherein the controller is further configured to:
recognize, as the object of attention, a taillight of a vehicle in front of an own vehicle; and
transmit an instruction signal to a control system of the mobile body based on the recognition of taillight of the vehicle as the object of attention.

6. The imaging system according to claim 5, wherein the controller is further configured to:
recognize the vehicle in front of the own vehicle; and
recognize the taillight of the vehicle in front of the own vehicle as the object of attention after the recognition of the vehicle in front of the own vehicle.

7. The imaging system according to claim 6, wherein, the controller is further configured to transmit the instruction signal to the control system of the mobile body in a case where a relative speed of the own vehicle and the vehicle in front is one of equal to or above a second threshold.

8. The imaging system according to claim 4, wherein the controller is further configured to:
recognize a vehicle that travels in front of an own vehicle;
recognize, as the object of attention, a direction indicator of the vehicle in front of the own vehicle; and
transmit an instruction signal to a control system of the mobile body based on the recognition of the direction indicator of the vehicle as the object of attention.

9. The imaging system according to claim 4, wherein the controller is further configured to:
recognize a traffic light as the object of attention;
determine that the traffic light is a red light; and
transmit an instruction signal to a control system of the mobile body based on the recognition of the traffic light as the object of attention and the determination that the traffic light is the red light.

10. The imaging system according to claim 9, wherein the controller is further configured to:
determine change of the red light to a green light; and
transmit the instruction signal to the control system of the mobile body based on the determination of the change of the red light to the green light.

11. The imaging system according to claim 1, further comprising an image sensor configured to execute an imaging operation at a determined frame rate.

12. The imaging system according to claim 11, wherein the controller is further configured to:
execute object recognition, to recognize an object of attention, based on image data of the image sensor and the detection of the event; and
execute signal processing based on the object of attention.

13. The imaging system according to claim 12, wherein the controller is further configured to:
recognize a vehicle that travels in front of an own vehicle;
recognize, as the object of attention, a taillight of the vehicle that travels in front of the own vehicle; and
transmit, after the recognition of the vehicle that travels in the front, an instruction signal to a control system of a mobile body based on the recognition of the taillight of the vehicle that travels in front of the own vehicle.

14. The imaging system according to claim 12, wherein the controller is further configured to:
recognize a vehicle that travels in front of an own vehicle;
recognize, as the object of attention, a direction indicator of the vehicle that travels in front of the own vehicle; and
transmit, after the recognition of the vehicle that travels in the front, an instruction signal to a control system of a mobile body based on the recognition of the direction indicator of the vehicle that travels in front of the own vehicle.

15. The imaging system according to claim 12, wherein the controller is further configured to:
recognize a traffic light as the object of attention;
determine the traffic light as a red light; and
transmit an instruction signal to a control system of a mobile body after the determination that the traffic light is the red light.

16. The imaging system according to claim 15, wherein the controller is further configured to:
determine change of the traffic light from the red light to a green light; and
transmit the instruction signal to the control system of the mobile body based on the change of the traffic light from the red light to the green light.

17. The imaging system according to claim 1, further comprising:
a first light receiving element with the first color filter, wherein the first light receiving element corresponds to the first pixel;
a second light receiving element with a second color filter of the plurality of color filters, wherein
the second light receiving element corresponds a second pixel of the plurality of pixels,
the first light receiving element is different from the second light receiving element, and
the first color filter is different from the second color filter;
a first transfer transistor configured to transfer a signal from the first light receiving element to a node;
a second transfer transistor configured to transfer a signal from the second light receiving element to the node; and
a third transfer transistor common to the first light receiving element and the second light receiving element, wherein
the event detection sensor further includes an event detector,
the third transfer transistor is connected to the node and the event detector, and
the event detector is configured to detect the event based on at least one of the signal from the first light receiving element or the signal from the second light receiving element.

* * * * *